US012737992B2

(12) United States Patent
Kurz et al.

(10) Patent No.: US 12,737,992 B2
(45) Date of Patent: Sep. 15, 2026

(54) DEVICES AND METHODS FOR MOTION PLANNING OF COMPUTER CHARACTERS

(71) Applicant: Apple Inc., Cupertino, CA (US)

(72) Inventors: Daniel Kurz, Sunnyvale, CA (US); Novaira Masood, San Jose, CA (US); Shem Nguyen, Oakland, CA (US); Jeremy R. Bernstein, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 161 days.

(21) Appl. No.: 18/174,560

(22) Filed: Feb. 24, 2023

(65) Prior Publication Data

US 2023/0290084 A1 Sep. 14, 2023

Related U.S. Application Data

(63) Continuation of application No. PCT/US2021/047217, filed on Aug. 23, 2021.

(60) Provisional application No. 63/069,609, filed on Aug. 24, 2020.

(51) Int. Cl.

| | |
|---|---|
| ***G06T 19/00*** | (2011.01) |
| ***G06F 3/01*** | (2006.01) |
| ***G06F 3/04815*** | (2022.01) |
| ***G06T 15/50*** | (2011.01) |

(52) U.S. Cl.

CPC ............ *G06T 19/006* (2013.01); *G06F 3/011* (2013.01); *G06T 15/50* (2013.01); *G06T 19/003* (2013.01); *G06F 3/04815* (2013.01)

(58) Field of Classification Search

None

See application file for complete search history.

(56) References Cited

U.S. PATENT DOCUMENTS 8,732,102 B2 * 5/2014 Rowe ...................... G06T 13/20 706/45
9,715,875 B2 * 7/2017 Piernot .................. G06F 3/013
9,812,151 B1 11/2017 Amini et al.
2007/0021200 A1 * 1/2007 Fox ......................... A63F 13/10 463/30
2018/0060032 A1 * 3/2018 Boesen ................ H04R 1/1016
2018/0314689 A1 * 11/2018 Wang .................. G10L 15/1822
2019/0026936 A1 * 1/2019 Gorur Sheshagiri ........................ G06F 3/04842
2019/0188895 A1 * 6/2019 Miller, IV .............. H04N 7/157
2019/0224853 A1 7/2019 Gewecke et al.
2020/0193264 A1 * 6/2020 Zavesky ................ G06N 20/00
2020/0404003 A1 * 12/2020 Alameh ................ H04L 9/0819
2021/0043005 A1 * 2/2021 Arora .................... H04W 4/025

(Continued)

OTHER PUBLICATIONS

Lampen et al, "A Context-Aware Assistance Framework for implicit interaction with an Augmented human", Jul. 10, 2020, Computer Vision—ECCV 2020: 16th European Conference. Glasgow, UK, Aug. 23-28, 2020, Proceedings (Lecture Notes in Computer Science) [retrieved on Jul. 10, 2020]. 20 pages (Year: 2020).*

(Continued)

*Primary Examiner* — Dorothy Harris

(74) *Attorney, Agent, or Firm* — Kubota & Basol LLP

(57) ABSTRACT

A computer-generated environment may include computer characters. Characteristics of the real-world environment are estimated and the interactions between computer characters and the real-world environment can be based on the estimated characteristics.

4 Claims, 10 Drawing Sheets

(56) References Cited

U.S. PATENT DOCUMENTS

| | | | | |
|---|---|---|---|---|
| 2021/0338177 | A1* | 11/2021 | Cavalli .................. | A61B 5/165 |
| 2021/0398359 | A1 | 12/2021 | Drummond et al. | |
| 2021/0407185 | A1 | 12/2021 | Drummond et al. | |
| 2022/0148248 | A1* | 5/2022 | McIntyre-Kirwin .. | G06V 20/20 |

OTHER PUBLICATIONS

Arroyo-Palacios, Jorge et al. "[Poster] Believable Virtual Characters for Mixed Reality," 2017 IEEE International Symposium on Mixed and Augmented Reality (ISMAR-Adjunct), Oct. 9, 2017, pp. 121-123 [retrieved on Oct. 27, 2017]. <DOI: 10.1109/ISMAR-ADJUNCT.2017.45>, 3 pages.

Avradinis, Nikos et al. "Behavior believability in virtual worlds: agents acting when they need to," May 28, 2013, [retrieved on Feb. 22, 2023]. Retrieved from the Internet: <https://www.ncbi.nlm.nih.gov/pmc/articles/PMC3698443/> <DOI: 10.1186/2193-1801-2-246>, 11 pages.

Badler, Norman et al. "Towards Personalities for Animated Agents With Reactive and Planning Behaviors," Dec. 6, 1995, [retrieved on Feb. 22, 2023]. Retrieved from the Internet: <https://repository.upenn.edu/cgi/viewcontent.cgi?article=1200&context=cis_reports>, 22 pages.

Campbell, Abraham G. et al. "Why, When and How to use AuRAs (Augmented Reality Agents)," Jun. 2013, [retrieved on Feb. 22, 2023]. Retrieved from the Internet: <https://www.researchgate.net/publication/271952956_Why_when_and_how_to_use_augmented_reality_agents_AuRAs> <DOI:10.1007/s10055-013-0239-4>, 34 pages.

Hübner, Patrick et al. "Evaluation of Hololens Tracking and Depth Sensing for Indoor Mapping Applications," Feb. 14, 2020. vol. 20, No. 4, pp. 1-24. Retrieved from the Internet: <https://www.ncbi.nlm.nih.gov/pmc/articles/PMC7070293/pdf/sensors-20-01021.pdf> <DOI: 10.3390/s20041021>, 24 pages.

Kim, Kangsoo et al. "Does a Digital Assistant Need a Body? The Influence of Visual Embodiment and Social Behavior on the Perception of Intelligent Virtual Agents in AR," 2018 [retrieved on Feb. 24, 2023]. Retrieved from the Internet: <https://sreal.ucf.edu/wp-content/uploads/2018/08/Kim2018a.pdf>, 10 pages.

Lampen, Eva et al. "A Context-Aware Assistance Framework for Implicit Interaction with an Augmented Human," Computer Vision—ECCV 2020: 16th European Conference. Glasgow, UK, Aug. 23-28, 2020, Proceedings (Lecture Notes in Computer Science) [retrieved on Jul. 10, 2020]. ISBN: 978-3-030-58594-5, 20 pages.

Mateas, Michael. "An Oz-Centric Review of Interactive Drama and Believable Agents," School of Computer Science, Carnegie Mellon University, Pittsburgh, PA, Jun. 1997, [retrieved on Feb. 22, 2023]. Retrieved from the Internet: <http://www.cs.cmu.edu/afs/cs/project/oz/web/papers/CMU-CS-97-156.html>, 19 pages.

Shneiderman, Ben et al. "Direct Manipulation," 1997 [retrieved on Feb. 22, 2023]. Retrieved from the Internet: <https://www.lri.fr/~mbl/ENS/FONDIHM/2013/papers/ShneidermanMaes-Interactions97.pdf>, 20 pages.

Wang, Isaac et al. "Exploring Virtual Agents for Augmented Reality," Human Factors in Computing Systems. New York, NY, May 2, 2019, pp. 1-12. ISBN: 9781450359719 <DOI: 10.1145/3290605.3300511>, 12 pages.

* cited by examiner

400

- Characteristic 1
- Characteristic 2
- Characteristic N

410

Agent 2 Personality

- Characteristic 1 0.6
- Characteristic 2 0.8
- Characteristic N 0.1

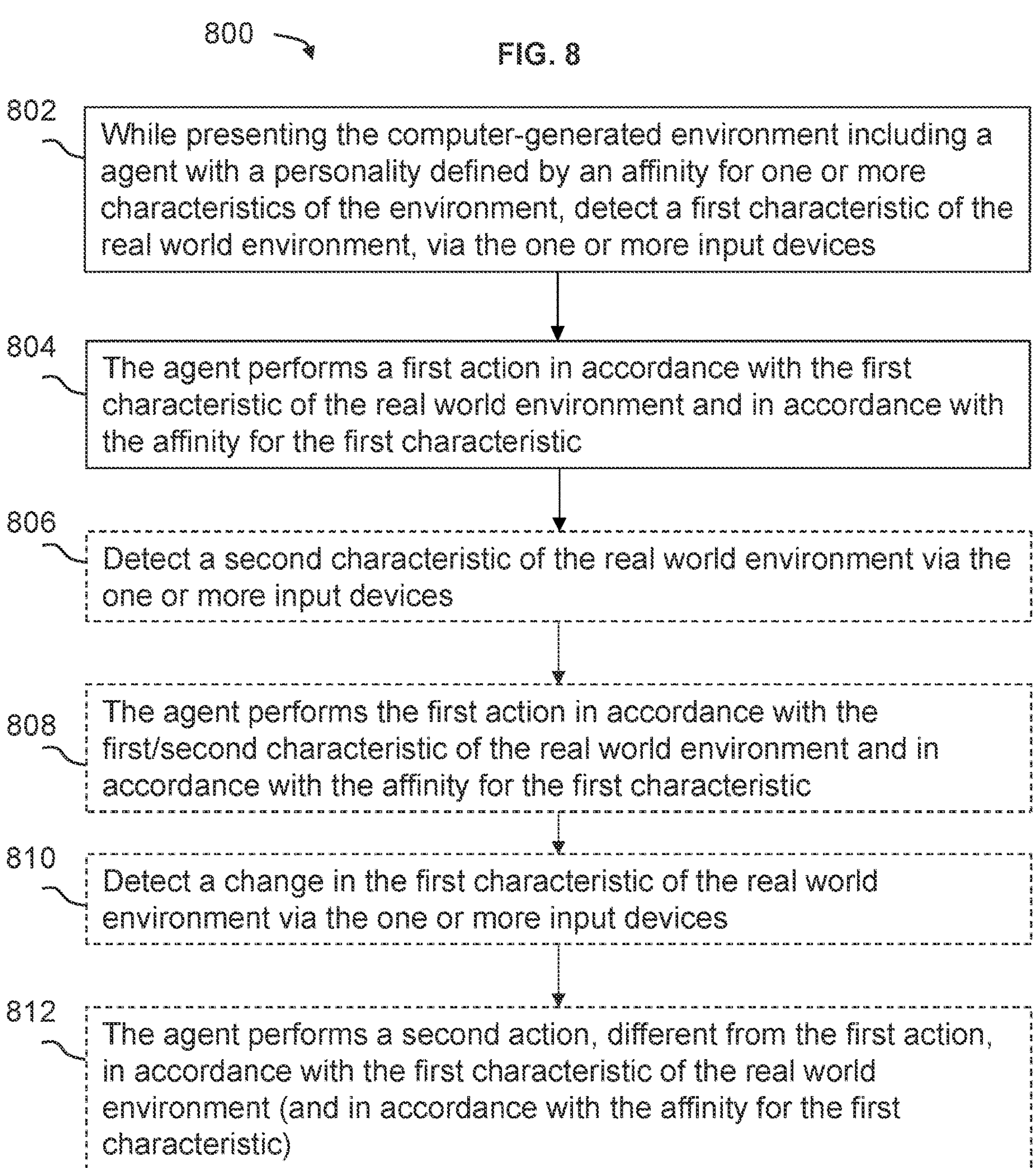
800
FIG. 8
802
While presenting the computer-generated environment including a agent with a personality defined by an affinity for one or more characteristics of the environment, detect a first characteristic of the real world environment, via the one or more input devices
804
The agent performs a first action in accordance with the first characteristic of the real world environment and in accordance with the affinity for the first characteristic
806
Detect a second characteristic of the real world environment via the one or more input devices
808
The agent performs the first action in accordance with the first/second characteristic of the real world environment and in accordance with the affinity for the first characteristic
810
Detect a change in the first characteristic of the real world environment via the one or more input devices
812
The agent performs a second action, different from the first action, in accordance with the first characteristic of the real world environment (and in accordance with the affinity for the first characteristic)

DEVICES AND METHODS FOR MOTION PLANNING OF COMPUTER CHARACTERS

CROSS-REFERENCE TO RELATED APPLICATIONS

This application is a continuation of International Application No. PCT/US2021/047217, filed Aug. 23, 2021, which claims the priority benefit of U.S. Provisional Application No. 63/069,609, filed Aug. 24, 2020, the contents of which are hereby incorporated by reference in their entireties for all intended purposes.

FIELD OF THE DISCLOSURE

This relates generally to devices, methods, and graphical user interfaces for virtual agent, and more specifically to virtual agent interactions.

BACKGROUND OF THE DISCLOSURE

Computer-generated environments are environments where at least some objects displayed for a user's viewing are generated using a computer. A virtual agent displayed in the computer-generated environment may perform various actions.

SUMMARY OF THE DISCLOSURE

Some embodiments described in this disclosure are directed to devices, methods, and graphical user interfaces for a virtual agent in a computer-generated environment. Some embodiments described in this disclosure are directed to interactions between a virtual agent and the real-world environment. Some embodiments described in this disclosure are directed to estimating a characteristic (or multiple characteristics) of the real-world environment, and to the interactions between virtual agent and the real-world environment based on the estimated characteristic(s) of the real-world environment. Some embodiments described in this disclosure are directed to a personality of the virtual agent, and to interactions between virtual agent and the real-world environment based on the personality of the virtual agent and the estimated characteristic(s) of the real-world environment. The devices, methods, and graphical user interfaces for a virtual agent provide an improved user experience for virtual agents in computer-generated environments. For example, the behavior of the virtual agent may be more realistic for the real-world circumstances and/or the interactions between the virtual agent and the environment may be more contextually rich. It is understood that this Summary does not limit the scope of the disclosure in any way. Additional descriptions of the embodiments of this disclosure are provided in the Drawings and the Detailed Description that follow.

BRIEF DESCRIPTION OF THE DRAWINGS

FIG. 8 illustrates an example process for a virtual agent in a computer-generated environment in accordance with some embodiments of the disclosure.

DETAILED DESCRIPTION

Figure 1:
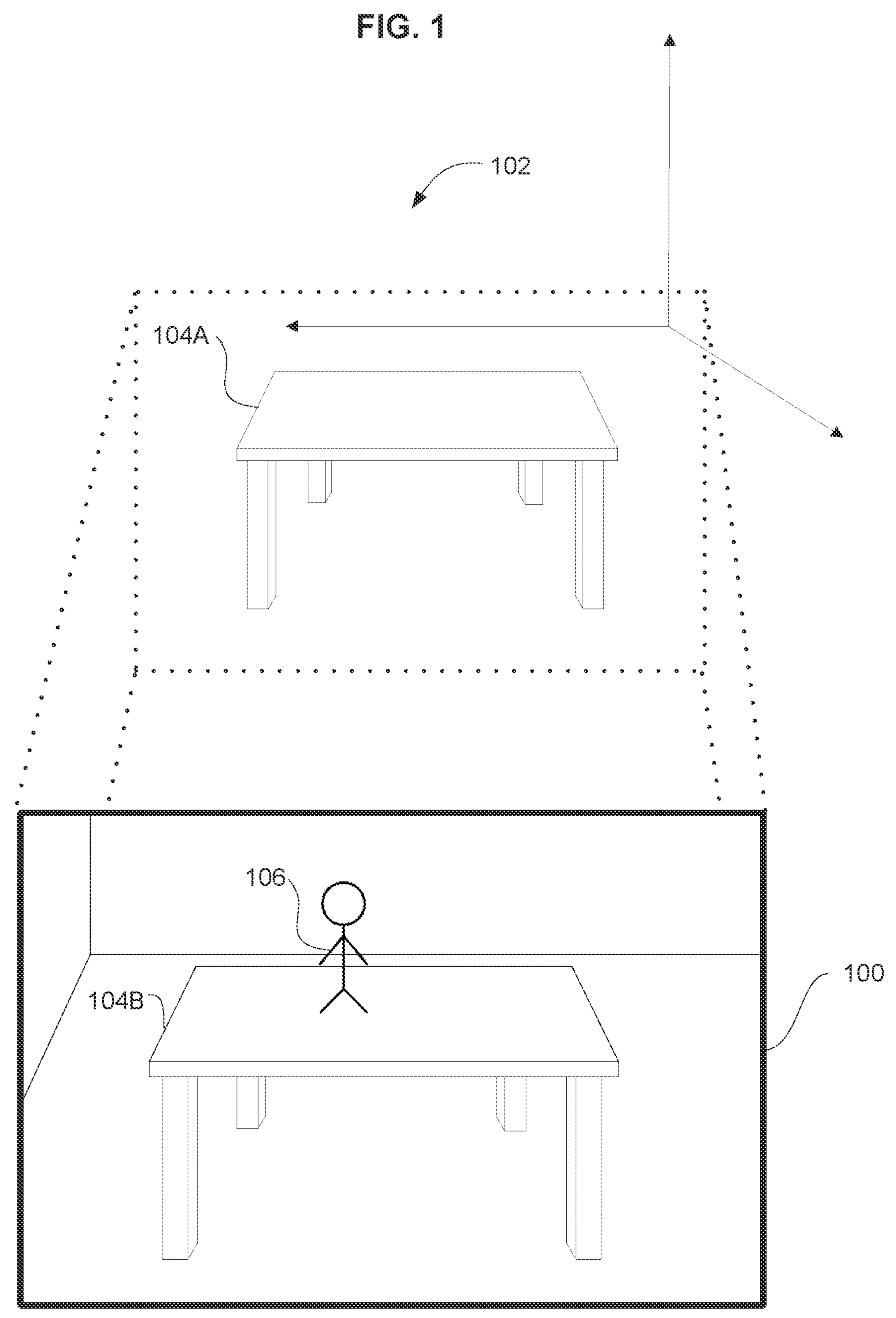
FIG. 1 illustrates an electronic device displaying a computer-generated environment according to some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. An XR environment is often referred to herein as a computer-generated environment. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

As described herein, a virtual agent (also referred to herein as a computer character or computer-generated character) interacts the real-world environment to provide an improved user experience for virtual agents in computer-generated environments. For example, the behavior of the virtual agent may be more realistic for the real-world circumstances and/or the interactions between the virtual agent and the environment may be more contextually rich. As described herein, in some embodiments one or more characteristics (e.g., lighting, temperature, geometry, etc.) of the real-world environment are estimated, and to the interactions between virtual agent and the real-world environment are based on the estimated characteristic(s) of the real-world environment. In some embodiments, interactions between virtual agent and the real-world environment are based on a personality of the virtual agent and the estimated characteristic(s) of the real-world environment.

FIG. 1 illustrates an electronic device 100 configurable to present a virtual agent according to some embodiments of the disclosure. In some embodiments, electronic device 100 is a portable electronic device, such as a tablet computer, laptop computer or a smartphone, among other possibilities. Example architectures of electronic device 100 are described in further detail with reference to FIGS. 2A-2B. FIG. 1 illustrates electronic device 100 and table 104A located in the physical environment 102. In some embodiments, electronic device 100 is configured to capture and/or display areas of physical environment 102 including table 104A (illustrated in the field of view of electronic device 100). In some embodiments, the electronic device 100 is configured to display one or more virtual objects in the computer-generated environment that are not present in the physical environment 102, but are displayed in the computer generated environment (e.g., positioned on or otherwise anchored to the top surface of a computer-generated representation 104B of real-world table 104A). In FIG. 1, for example, an object—virtual agent 106—is displayed on the surface of the table 104B in the computer-generated environment displayed via device 100, optionally in response to detecting the planar surface of table 104A in the physical environment 102. It should be understood that although virtual agent 106 is represented in FIG. 1 that virtual agent 106 is a representative object and one or more different objects (e.g., of various dimensionality such as two-dimensional or three-dimensional objects) can be included and rendered in a two-dimensional or a three-dimensional computer-generated environment. For example, the virtual objects can include an application or a user interface displayed in the computer-generated environment. Additionally, it should be understood, that the three-dimensional (3D) environment (or 3D object) described herein may be a representation of a 3D environment (or 3D object) displayed in a two dimensional (2D) context (e.g., displayed on a 2D display screen).

Figure 2A:
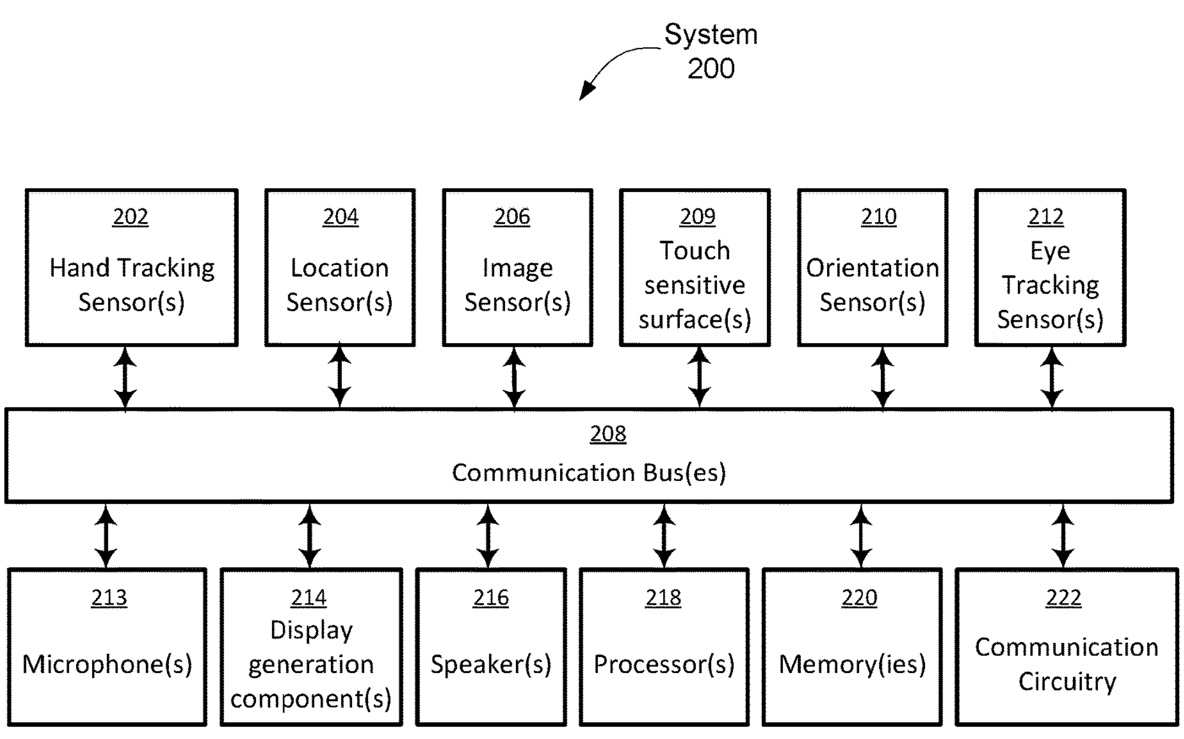
FIGS. 2A-2B illustrate example block diagrams of architectures for a system or device in accordance with some embodiments of the disclosure.
Figure 2B:
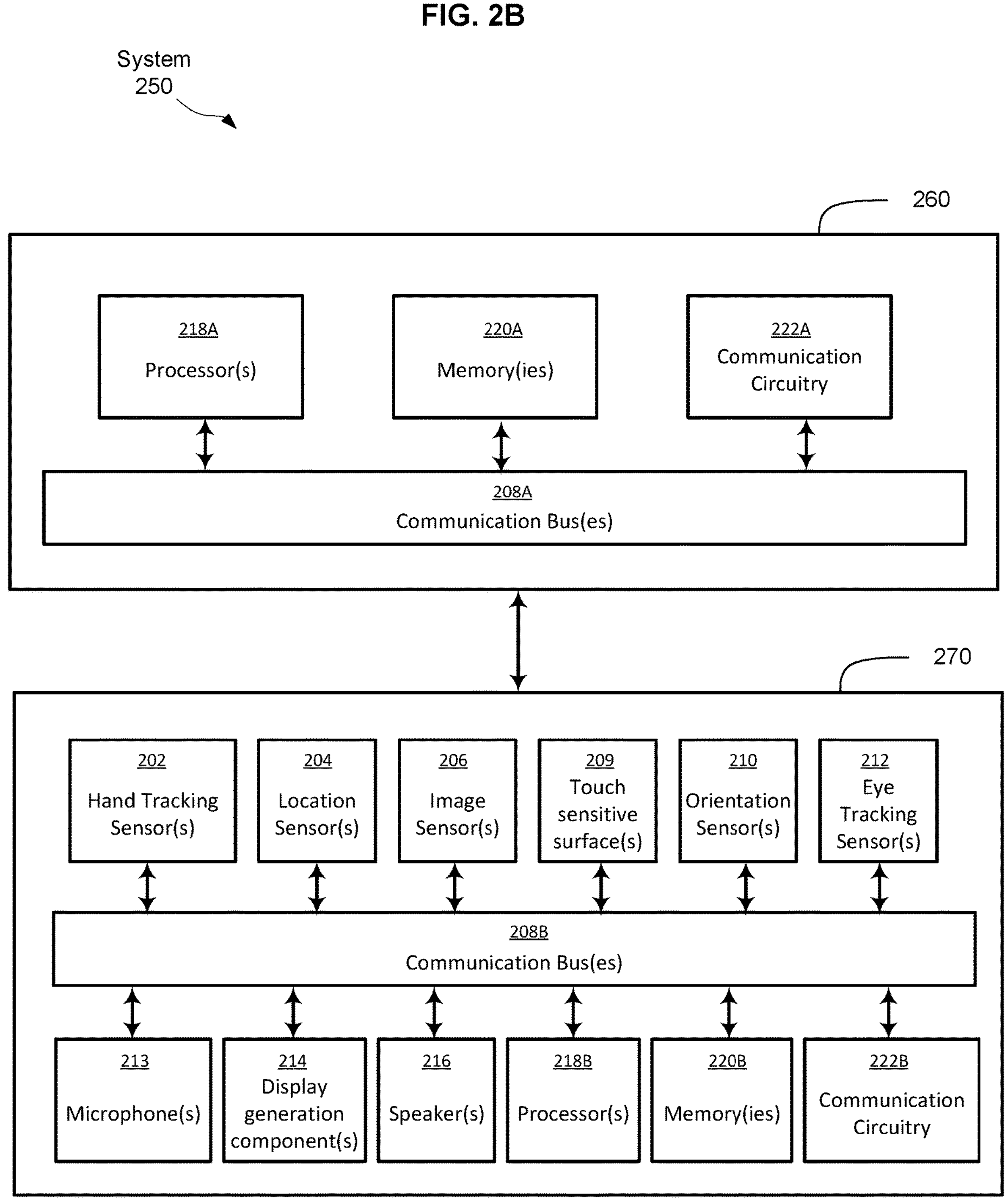

FIGS. 2A-2B illustrate example block diagrams of architectures for a system or device in accordance with some embodiments of the disclosure. In some embodiments, device 200 is a portable device, such as a mobile phone, smart phone, a tablet computer, a laptop computer, an auxiliary device in communication with another device, etc. As illustrated in FIG. 2A, device 200 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218, one or more memories 220, and/or communication circuitry 222. One or more communication buses 208 are optionally used for communication between the above mentioned components of device 200.

Communication circuitry 222 optionally includes circuitry for communicating with electronic devices, networks, such as the Internet, intranets, a wired network and/or a wireless network, cellular networks and wireless local area networks (LANs). Communication circuitry 222 optionally includes circuitry for communicating using near-field communication (NFC) and/or short-range communication, such as Bluetooth®.

Processor(s) 218 optionally include one or more general purpose processors, one or more graphics processors, and/or one or more digital signal processors (DSPs). In some embodiments, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some embodiments, memories 220 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display generation component(s) 214 optionally include a single display (e.g., a liquid-crystal display (LCD), organic light-emitting diode (OLED), or other types of display). In some embodiments, display generation component(s) 214 include multiple displays. In some embodiments, display generation component(s) 214 includes a display with a touch-sensitive surface (e.g., a touch screen), a projector, a holographic projector, a retinal projector, etc.

In some embodiments, device 200 includes touch-sensitive surface(s) 209 configured to receive user inputs (touch and/or proximity inputs), such as tap inputs and swipe inputs or other gestures. In some embodiments, display generation component(s) 214 and touch-sensitive surface(s) 209 together form touch-sensitive display(s) (e.g., a touch screen integrated with device 200 or external to device 200 that is in communication with device 200). It should be understood, that device 200 optionally includes or receives input from one or more other physical user-interface devices than a touch-sensitive surface, such as a physical keyboard, a mouse, a stylus and/or a joystick (or any other suitable input device).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment. Image sensor(s) 206 optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 200 uses CCD sensors, event cameras, and depth sensors in combination to detect the physical environment around device 200. In some embodiments, image sensor(s) 206 include a first image sensor and a second image sensor. The first image sensor and the second image sensor work together and are optionally configured to capture different information of physical objects in the real-world environment. In some embodiments, the first image sensor is a visible light image sensor and the second image sensor is a depth sensor. In some embodiments, device 200 uses image sensor(s) 206 to detect the position and orientation of device 200 and/or display generation component(s) 214 in the real-world environment. For example, device 200 uses image sensor(s) 206 to track the position and orientation of display generation component(s) 214 relative to one or more fixed objects in the real-world environment.

In some embodiments, device 200 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display generation component(s) 214, and/or relative to another coordinate system. Eye tracking sensor(s) 212 are configured to track the position and movement of a user's gaze (eyes, face, or head, more generally) with respect to the real-world or computer-generated environment and/or relative to the display generation component(s) 214. The user's gaze can include a direction in which the eyes are directed, and optionally intersection with a particular point or region of space and/or intersection with a particular object. In some embodiments, hand tracking sensor(s) 202 and/or eye tracking sensor(s) 212 are implemented together with the display generation component(s) 214 (e.g., in the same device). In some embodiments, the hand tracking sensor(s) 202 and/or eye tracking sensor(s) 212 are implemented separate from the display generation component(s) 214 (e.g., in a different device).

In some embodiments, the hand tracking sensor(s) 202 uses image sensor(s) 206 (e.g., one or more IR cameras, 3D cameras, depth cameras, etc.) that capture three-dimensional information from the real-world including one or more hands. In some examples, the hands can be resolved with sufficient resolution to distinguish fingers and their respective positions. In some embodiments, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some embodiments, eye tracking sensor(s) 212 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some embodiments, both eyes are tracked separately by respective eye tracking cameras and illumination sources, and gaze can be determined from tracking both eyes. In some embodiments, one eye (e.g., a dominant eye) is tracked by a respective eye tracking camera/illumination source(s).

Device 200 optionally includes microphones(s) 213 or other audio sensors. Device 200 uses microphone(s) 213 to detect sound from the user and/or the real-world environment of the user. In some embodiments, microphone(s) 213 includes an array of microphones that optionally operate together (e.g., to identify ambient noise or to locate the source of sound in space of the real-world environment). In some embodiments, audio and/or voice inputs can be used to interact with the user interface or computer-generated environment captured using one or more audio sensors (e.g., microphones), as permitted by the user of the electronic device.

Device 200 optionally includes location sensor(s) 204 configured to detect a location of device 200 and/or of display generation component(s) 214. For example, location sensor(s) 204 optionally includes a GPS receiver that receives data from one or more satellites and allows device 200 to determine the device's absolute position in the physical world.

Device 200 optionally includes motion and/or orientation sensor(s) 210 configured to detect orientation and/or movement of device 200 and/or display generation component(s) 214. For example, device 200 uses orientation sensor(s) 210 to track changes in the position and/or orientation of device 200 and/or display generation component(s) 214 (e.g., with respect to physical objects in the real-world environment). Orientation sensor(s) 210 optionally include one or more gyroscopes, one or more accelerometers, and/or one or more inertial measurement units (IMUs).

It is understood that the architecture of FIG. 2A is an example architecture, but that system/device 200 is not limited to the components and configuration of FIG. 2A. For example, the device/system can include fewer, additional, or other components in the same or different configurations. In some embodiments, as illustrated in FIG. 2B, system/device 250 can be divided between multiple devices. For example, a first device 260 optionally includes processor(s) 218A, memory or memories 220A, and communication circuitry 222A, optionally communicating over communication bus(es) 208A. A second device 270 (e.g., corresponding to device 200) optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218B, one or more memories 220B, and/or communication circuitry 222B. One or more communication buses 208B are optionally used for communication between the above mentioned components of device 270. The details of the components for devices 260 and 270 are similar to the corresponding components discussed above with respect to device 200 and are not repeated here for brevity. First device 260 and second device 270 optionally communicate via a wired or wireless connection (e.g., via communication circuitry 222A-222B) between the two devices.

Device 200 or device 250 typically support a variety of applications that may be displayed in the computer-generated environment, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo/video management application, a digital camera application, a digital video camera application, a web browsing application, a digital music player application, a television channel browsing application, and/or a digital video player application.

A computer-generated environment may be displayed using an electronic device (e.g., electronic device 100, device 200, device 250), including using one or more display generation components. The computer-generated environment can optionally include various graphical user interfaces ("GUIs") and/or user interface objects. As described herein, in some embodiments, the computer-generated environment includes a virtual agent. A virtual agent described herein refers to computer-generated character (e.g., an animated character) programmed to perform various behaviors. In some embodiments, a virtual agent may include artificial intelligence that allows the agent to perform decision-making as part of the various behaviors. In some embodiments, the virtual agent is a digital pet, digital assistant, or a digital companion. In some embodiments, the virtual agent is defined by a personality. The personality can include an affinity for (or aversion to) one or more characteristics of the environment or objects or activities, among other possibilities. In some embodiments, the behavior of the virtual agent may depend on one or more characteristics of the real-world environment (e.g., measured by one or more sensors) and/or of the virtual environment. As such, personality (e.g., affinity/aversion) and/or characteristics of the environment can be used to improve the user experience with respect to virtual agents. For example, the behavior of the virtual agent may more realistic for the real-world circumstances and/or the interactions between the virtual agent and the environment may be more contextually rich and customized to the user's expectations. In some embodiments, a virtual agent's personality is adjustable by a user (e.g., from a default personality).

In some embodiments, the electronic device can detect or estimate a lighting characteristic of the real world, and the estimate of the lighting characteristic of the real-world is used to influence behavior of the virtual agent. The estimate of the lighting characteristic can provide some understanding of lighting in the environment. For example, the estimate of the lighting characteristic may provide an indication of which regions of the real-world environment are light or dark. The estimate of the lighting characteristic may provide an indication of the position of light sources (e.g., parametric light sources, directional light sources, point light sources, area light sources, etc.) and/or orientation of light sources. In some embodiments, the lighting characteristic is estimated as a per-voxel incident light field indicating brightness, color and/or direction. For example, the lighting characteristic can be parameterized as an image-based lighting (IBL) environment map. It should be understood that other parameterizations of the lighting characteristic are possible. In some examples, the lighting characteristic is estimated on a per pixel basis of using a triangle mesh with the lighting characteristic defining lighting for each vertex or for each face. Additionally, it should be understood that the estimate of the lighting characteristic is optionally derived from an intermediate representation (e.g., environment map).

In some embodiments, sensors such as cameras (e.g., image sensor(s) 206) are used to capture images of the real-world environment. The images can be processed by processing circuitry (one or more of processor(s) 218) to localize and measure light sources. In some embodiments, light can be determined from the reflections and or shadows cast by light sources in the environment. In some embodiments, deep learning (e.g., supervised) or other artificial intelligence or machine learning is used to estimate the lighting characteristic based on input image(s).

Figure 3:
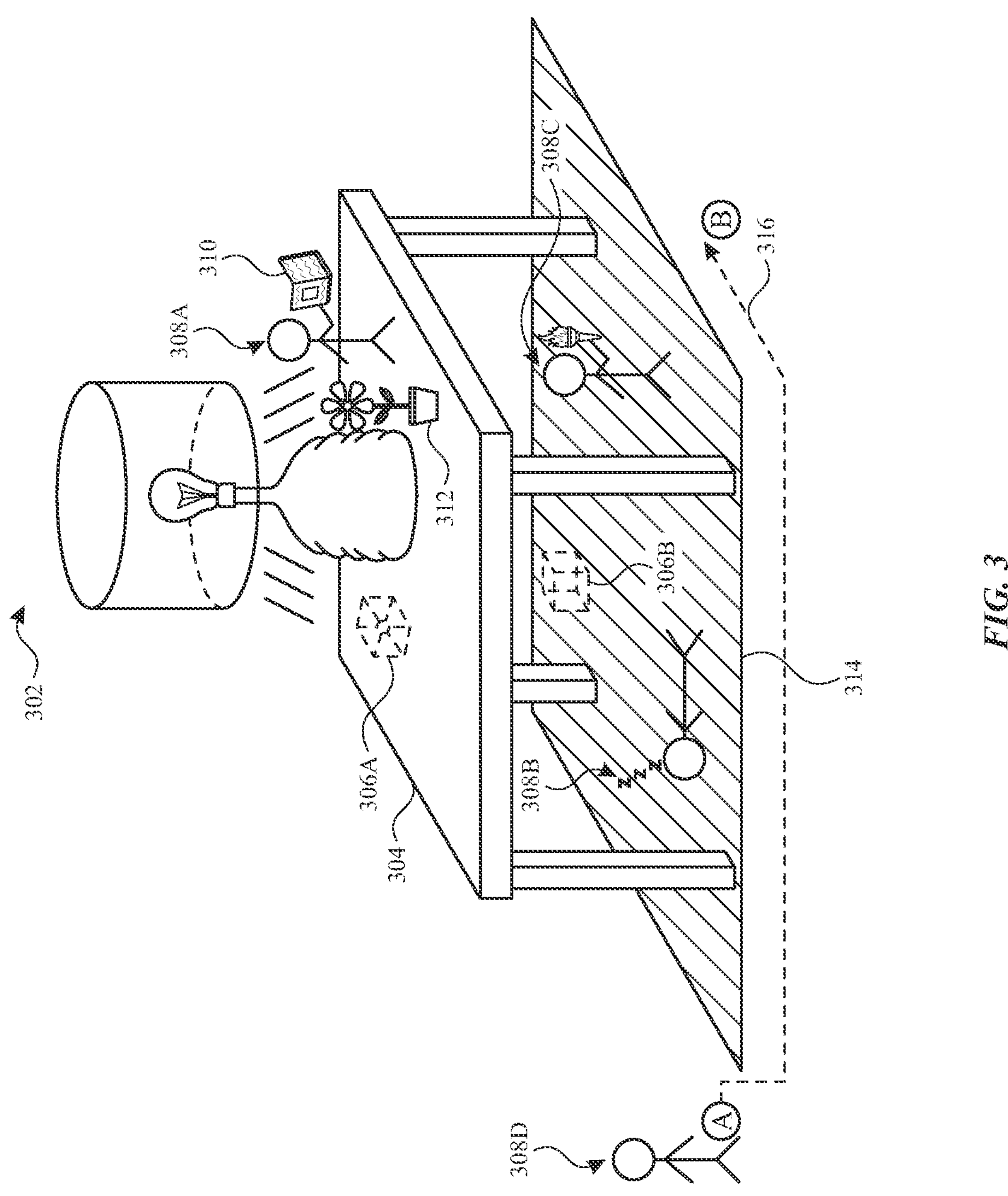
FIG. 3 illustrates an example of a virtual agent behaving in accordance with a lighting characteristic of a real-world environment according to some embodiments of the disclosure.

FIG. 3 illustrates an example of a virtual agent behaving in accordance with a lighting characteristic of a real-world environment according to some embodiments of the disclosure. FIG. 3 illustrates a computer-generated environment including real-world objects or representations of real-world objects. The real-world objects include a real-world light source, such as lamp 302, and table 304. FIG. 3 also shows representative voxels 306A-306B in different regions of the environment (though these voxels are not necessarily visible to the user in the computer-generated environment). As described herein, the lighting characteristic is estimated for the environment. For example, voxel 306A and voxel 306B are representative voxels that indicate the lighting of the environment at their respective regions of the environment. Voxel 306A, which is exposed to light from lamp 302, may indicate relatively more light in corresponding the region of the environment as compared with the light incident on voxel 306B which is located beneath the table 304 and at least partially obstructed by table 304 (e.g., as indicated by the shadow 314 cast by table 304).

In some embodiments, the behavior of the virtual agent is based on the estimated lighting characteristic of the real-world environment. In some embodiments, the virtual agent determines its behavior based on the lighting characteristic.

For example, a virtual agent located in a dark region in the environment as defined by the lighting characteristic may perform a first action (e.g., going to sleep, as indicated by virtual agent 308B sleeping in the relatively dark region beneath table 304) and a virtual agent located in a light region in the environment may perform a second, different action (e.g., reading a book, as indicated by virtual agent 308A reading a book). In some embodiments, the virtual agent determines where to perform an activity in the environment—in a region with suitable lighting-based on the lighting characteristic. For example, a virtual agent instructed to read a book (or independently deciding to read a book using artificial intelligence) may seek and navigate to a bright region of the environment (e.g., the region occupied by virtual agent 308A in FIG. 3), and a virtual agent instructed to sleep (or independently deciding to rest using artificial intelligence) may seek and navigate to a dark region of the environment (e.g., the region occupied by virtual agent 308B in FIG. 3).

In some embodiments, the virtual agent determines how to orient itself and/or another virtual object in the environment based on the lighting characteristic. For example, a virtual agent reading a book (or independently deciding to read a book using artificial intelligence) may seek to orient itself and/or the book to illuminate the text in the book, and to not have the virtual agent's eyes oriented toward a light source. For example, as shown in FIG. 3, virtual agent 308A orients itself and book 310, such that light for the lamp is incident on the pages of the book and not in the eyes of the virtual agent. As another example, a virtual agent can avoid looking in the direction of the sun or another bright light source (independent of performing another action).

In some embodiments, the virtual agent determines where to place another virtual object in the environment based on the lighting characteristic. For example, a virtual agent planting or placing flowers may seek to plant the flowers in a sunny (or otherwise well illuminated) region in the environment. For example, FIG. 3 shows the virtual agent placing potted flowers 312 in a region of the environment with incident light from lamp 302. As another example, a virtual agent may seek to park a vehicle in a shady region of the environment (e.g., beneath table 304 in FIG. 3).

Figure 4:
FIG. 4 illustrates example representations of a personality for a virtual agent according to some embodiments of the disclosure.

In some embodiments, the behavior of the virtual agent in accordance with the lighting characteristic is further based on the personality of the virtual agent. For example, the virtual agent's personality may define an affinity for various characteristics. FIG. 4 illustrates example representations of a personality for a virtual agent according to some embodiments of the disclosure. In some embodiments, the personality is defined using an affinity for various characteristics, optionally using parameters or using a slider (e.g., between a maximum and a minimum). For example, representation 400 (e.g., a user interface) of a personality for a first virtual agent includes an affinity for characteristics 1-N defined using a slider user interface element for each of the characteristics. Representation 410 (e.g., a user interface) of a personality for a second virtual agent includes an affinity for characteristics 1-N defined using a parameter for each of the characteristics (e.g. entered into a field). In some embodiments, the virtual agent's personality is defined using a mix of parameters and sliders, or using other means (e.g., using buttons, check-boxes, etc.). In some embodiments, representations 400 and/or 410 are presented to the user in a content creation environment to provide a personality to a virtual agent that is to be implemented during run-time operations. In some embodiments, representations 400 and/or 410 are optionally presented to the user during run-time to make adjustments to the virtual agent's personality.

In some embodiments, the virtual agent's personality may define an affinity for specific lighting (e.g., an affinity for brightness). For example, the virtual agent may have a preference for specific amount lighting (brighter/darker) and/or for a specific color of lighting. In some embodiments, the affinity for the lighting can be defined using parameters or a slider user interface element (e.g., representing one of the characteristics shown in FIG. 4). For example, affinity for the lighting can be represented by a parameter between a maximum value and a minimum value, or by a position of a slider between a maximum and a minimum position. In some embodiments, a maximum value may indicate a strong affinity for brightness and a minimum value may indicate a strong aversion to brightness (with some intermediate value representing neutrality to brightness). In some embodiments, a maximum value may indicate a strong affinity for brightness and a minimum value may indicate neutrality to brightness (with an aversion to brightness instead defined by an affinity to darkness, using a second parameter/slider for a separate characteristic of the virtual agent's personality). In some embodiments, the virtual agent's personality may define an affinity for a range of lighting (e.g., a preference for an amount of lighting bounded by two values (or between two buttons of a multi-button slider). In some embodiments, the affinity for lighting is optionally activity- or task-specific (e.g., the virtual agent may have more tolerance or affinity for brightness for swimming than for reading).

As an example, the virtual agent with a strong affinity for brightness (or an aversion for darkness) may avoid dark regions of an environment. For example, if the virtual agent creates a navigation plan for movement in the environment, the virtual agent avoids or disfavors darker regions and seeks or favors lighter regions of the environment. For example, virtual agent 308D navigating from point A to point B in FIG. 3 may create a navigation plan represented by path 316 that avoids shadow 314 corresponding to a darker region of the environment. Additionally, when such a virtual agent is located in a darker region of the environment, the virtual agent may move from the darker region to the lighter region of the environment. For example, virtual agent 308C in shadow 314 may navigate to a region of the environment outside of shadow 314. In some embodiments, the behavior of the virtual agent can include an action to mitigate environmental conditions that are inconsistent with the affinity for specific lighting. For example, a virtual agent with an affinity for brightness (e.g., scared of the dark) can produce and turn on a virtual light source in a dark environment, such as a flashlight or a torch to generate virtual light to brighten the environment. For example, virtual agent 308C in shadow 314 is shown carrying a virtual torch to counteract the darkness of the real-world environment. In some embodiments, the virtual agent can control a real-world light source (e.g., turn on or change the dimming level of a light source such as lamp 302) based on its affinity for brightness. In some embodiments, the virtual agent can provide feedback to the user to suggest a change in a real-world light source and the light source can be controlled by user input in response. For example, a virtual agent can point out to the user that the environment is dark and suggest turning on a light or ask permission to turn on a real-world light source (or otherwise control the real-world light source). In response to a user input, such as a voice command response providing approval, the virtual agent can control the real-world light source. A virtual agent with a different personality may behave differently. For example, a virtual agent with an affinity for darkness may seek darker regions when planning navigation, leave brighter regions when located in a brighter region, or turn off a light or conjure a virtual tent or a virtual hat to mitigate brightness of the environment. As another example, a virtual agent neutral to brightness and darkness may treat darker and lighter regions of the environment as equivalent and irrelevant when planning navigation (e.g., virtual agent 308D may take a direct path from point A to point B through shadow 314), or may stay in its location without moving to a region with different lighting, or may take no action to mitigate the lighting characteristic.

The affinity or aversion to lighting defined by the virtual agent's personality may also impact what activity the virtual agent performs (or does not perform), how the virtual agent performs the activity, how the virtual agent orients itself and/or virtual objects, and/or where to place virtual objects, among other possibilities.

It is understood that the above description of representations of the lighting characteristic, personality and corresponding behaviors by the virtual agent in accordance with the personality and/or lighting characteristic are exemplary illustrations of improving the behavior/interactions between a virtual agent and the real world (optionally in accordance with the virtual agent's personality). Additionally, although the above description is primarily focused on estimating a lighting characteristic of a real-world environment, a virtual agent's behavior optionally also takes into account a virtual lighting characteristic for a computer-generated environment. For example, information about virtual light sources and/or a per-voxel incident light field indicating brightness, color and/or direction of virtual light sources can be used (e.g., combined with or superimposed on the real-world light field) to determine a mixed-reality estimate of the lighting characteristic, which is used by the virtual agent to determine or modify behavior. In some embodiments, the virtual agent can determine or modify its behavior using the virtual lighting characteristic different than the real-world lighting characteristic. For example, a virtual agent may perceive an environment with a first real-world lighting characteristic as an environment with a second, different lighting characteristic (e.g., a virtual lighting characteristic). As an example, a virtual agent may perceive a real-world dark environment as a virtual bright environment or vice versa. In some such examples, the virtual agent may rely on some real-world characteristics of the environment (e.g., geometric characteristics, material characteristics, etc.), but substitute the virtual lighting characteristic for the real-world lighting characteristic.

In some embodiments, the electronic device can detect or estimate a material characteristic of the real world, and the estimate of the material characteristic of the real world is used to influence behavior of the virtual agent. The estimate of the material characteristic can provide some understanding of materials in the environment. For example, the estimate of the material characteristic may provide an indication of which regions of the real-world environment are formed from various materials. In some embodiments, the material characteristic is estimated on a per-pixel basis for visible surfaces in images of the environment (or alternatively on a per-voxel basis for the environment or per-vertex or per-face using a triangle mesh for the environment). For example, the material characteristic can be parameterized as an image-based material environment map. In some embodiments, sensors such as cameras (e.g., image sensor(s) 206) capture images of the real-world environment. The images can be processed by processing circuitry (one or more of processor(s) 218) to classify each pixel (or voxel) in the images as a specific material class. For example, each pixel (or voxel) can be classified as one material class from a group of material classes. For example, the material classes can include plastic, wood, paper, carpet, grass, stone, glass, metal, liquid, etc., though more, fewer, or different material classes may be used. In some embodiments, deep learning (e.g., supervised) or other artificial intelligence or machine learning is used to estimate the material characteristic based on input image(s) (e.g., treating the estimation of the material characteristic as a classification problem). Additionally, or alternatively, each pixel is classified as having material properties (e.g., thermal conductivity, smoothness, texture, etc.).

It should be understood that other parameterizations of the material characteristic are possible. Additionally, it should be understood that the estimate of the material characteristic is optionally derived from an intermediate representation (e.g., an environment map). In some embodiments, a semantic understanding of the real-world environment can be used to identify objects and the entire object (or portions of the object) can be classified with as a specific material. For example, rather than estimating the material as wood for each pixel of a wooden table, the estimation can estimate the material as wood (e.g., using a subset of the pixels of the wooden table) and then apply this classification to all the pixels of the wooden table.

Figure 5:
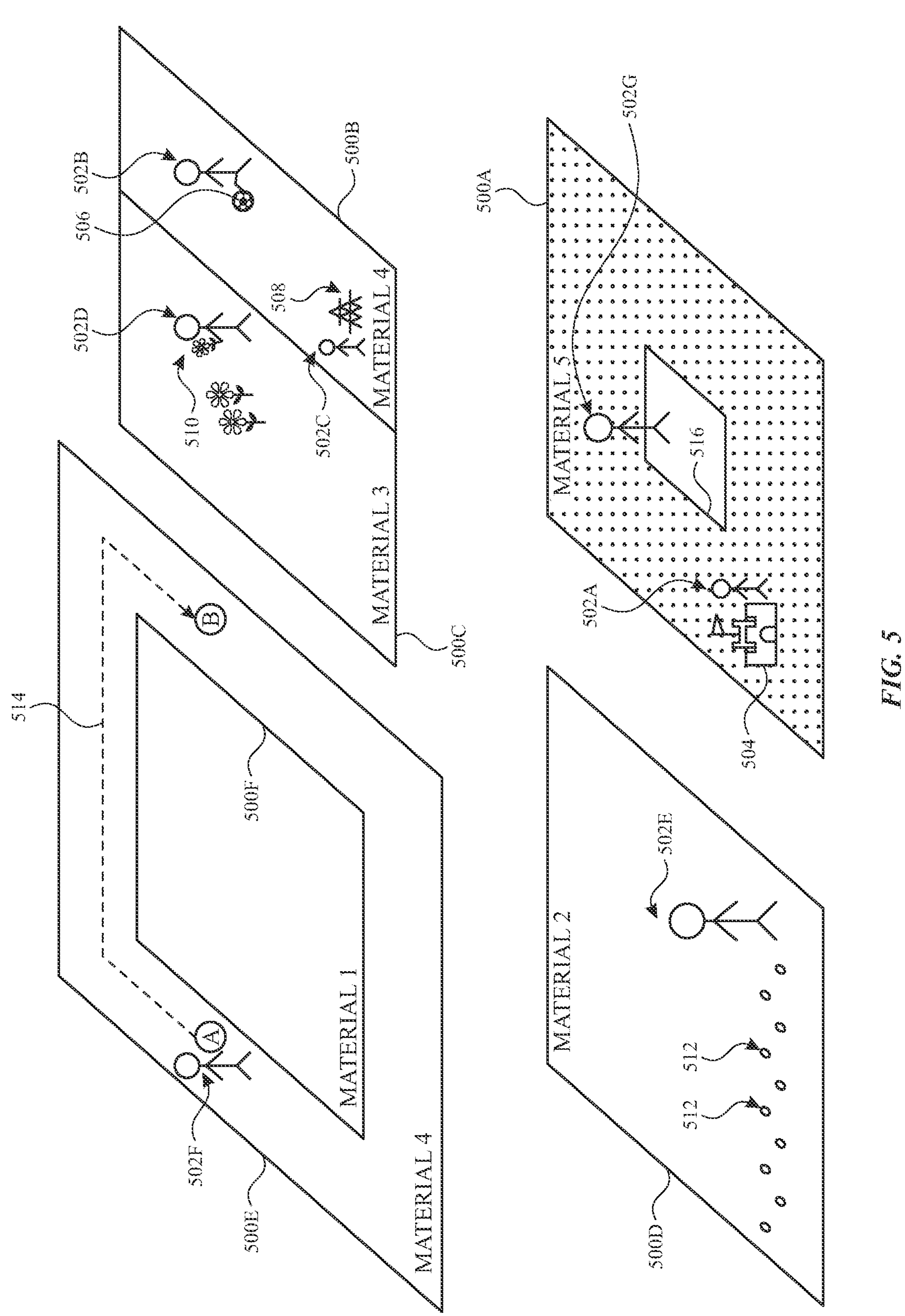
FIG. 5 illustrates an example of a virtual agent behaving in accordance with a material characteristic of a real-world environment according to some embodiments of the disclosure.

FIG. 5 illustrates an example of a virtual agent behaving in accordance with a material characteristic of a real-world environment according to some embodiments of the disclosure. FIG. 5 illustrates a portion of computer-generated environment including various real-world surfaces or representations of real-world surfaces having various material characteristics (materials 1-5).

In some embodiments, the behavior of the virtual agent is based on the estimated material characteristic of the real-world environment. In some embodiments, the virtual agent determines its behavior based on the material characteristic. For example, a virtual agent located in a sandy region in the environment as defined by the material characteristic may perform a first action (e.g., virtual agent 502A builds a sandcastle 504 in a sandy region 500A) and a virtual agent located in a stone region in the environment may perform a second, different action (e.g., virtual agent 502B bounces a ball 506 in stone region/concrete/wood/rubber region 500B). In some embodiments, the virtual agent determines where to perform an activity in the environment—in a region with suitable surfacing-based on the material characteristic. For example, a virtual agent instructed to or independently deciding to build a house of cards may seek and navigate to a stable material surface (e.g., virtual agent 502C builds house of cards 508 on a wood, stone region 500B) of the environment, and a virtual agent instructed to or independently deciding to build a sandcastle 504 may seek and navigate to a sandy region 500A of the environment.

In some embodiments, the virtual agent determines movement based on the material characteristic. For example, a virtual agent walking or driving may walk or drive with a different style based on the material over which the virtual agent is walking or driving. For example, a virtual agent may walk or drive differently (e.g., different gait, speed, etc.) over a sandy beach, concrete, ice, sticky surfaces, mud, a rubber playground or bouncy house, etc. In some embodiments, the virtual agent determines where to dwell or sit based on the material characteristic. For example, the virtual agent may prefer to dwell or sit on comfortable materials (e.g., fabric, grass, wood, etc.), optionally balancing softness and firmness, over less comfortable materials (e.g., metals or other surfaces with high thermal conductivity).

In some embodiments, the virtual agent determines where to place another object in the environment based on the material characteristic. For example, a virtual agent 502D planting flowers 510 may seek to plant the flower in dirt or soil in the environment (e.g., region 500C). As another example, a virtual agent may seek to park a vehicle on concrete in the environment.

In some embodiments, the electronic device can cause display of a virtual representation of tracks (e.g., footprints for virtual agents with feet). For example, virtual agent 502E walking over a snowy region 500D may leave tracks 512 in the snowy region. The appearance of the tracks is optionally dependent on the type of material and properties of the virtual agent. For example, as the appearance of tracks may be different for a virtual agent walking over dry sand, wet sand, snow, grass, concrete with wet feet, etc. Some materials may not show tracks at all (e.g., when walking over wood, stone, concrete with dry feet, etc.).

In some embodiments, the behavior of the virtual agent in accordance with the material characteristic is further based on the personality of the virtual agent. For example, the virtual agent's personality may define an affinity for (or aversion to) specific materials using parameters and/or sliders (similar to those described in FIG. 4 and with respect to the lighting characteristic).

As an example, the virtual agent with a strong affinity for a specified material or material property may seek regions of the environment with the specified material/material property. Likewise, a virtual agent with a strong aversion for a specified material or material property may avoid regions of environment with the specified material/material property. For example, if the virtual agent creates a navigation plan for movement in the environment, the virtual agent avoids or disfavors regions with materials/material properties to which the virtual agent has an aversion (e.g., slippery surfaces, sticky surfaces, ice, water, etc.) and seeks or favors regions with materials/material properties to which the virtual agent has an affinity (materials that are easy to walk on or drive on, such as grass, sidewalk, concrete). For example, virtual agent 502F may plot a navigation path between point A and point B in region 500E (including a material/material property with which the virtual agent has an affinity) and avoiding region 500F (including a material/material property to which the virtual agent has an aversion), despite the more direct path between point A and point B. Additionally, when such a virtual agent is located in a region of the environment with materials/material properties to which the virtual agent has an aversion, the virtual agent may move to a different region of the environment (e.g., to a region with materials/material properties to which the virtual agent has an affinity or less aversion).

In some embodiments, the behavior of the virtual agent can include an action to mitigate environmental conditions that are inconsistent with the affinity for a specific material/material property. For example, a virtual agent with an aversion for sand can produce and place a virtual blanket on the sand (e.g., virtual agent 502G produces and places blanket 516 in sandy region 500A), so that the virtual agent can comfortably dwell in the region of the environment, or a virtual agent may place a virtual pillow or chair on a cold/hard surface to more comfortably dwell/sit. A virtual agent with a different personality may behave differently in accordance with its affinity to or aversion to materials/material properties. Additionally, a virtual agent neutral to a material/material property may treat different material/material property regions of the environment as equivalent and irrelevant when planning navigation, or may stay in its location without moving to a region with different material/material properties, or may take no action to mitigate the material characteristic.

The affinity (or aversion) to the material characteristics defining the virtual agent's personality may also impact what activity to perform (or not perform), how to perform the activity (e.g., how to walk, where to dwell or sit), and/or where to place virtual objects, among other possibilities.

It is understood that the above description of representations of the material characteristic (material or material properties), personality and corresponding behaviors by the virtual agent in accordance with the personality and/or material characteristic are exemplary illustrations of improving the behavior/interactions between a virtual agent and the real world (optionally in accordance with the virtual agent's personality). Additionally, although the above description is primarily focused on estimating a material characteristic of a real-world environment, a virtual agent's behavior optionally also takes into account a virtual material characteristic for a computer-generated environment. For example, information about virtual and materials/surfaces can be used (e.g., combined or superimposed) to determine a mixed-reality estimate of the material characteristic, which is used by the virtual agent to determine or modify behavior. In some embodiments, the virtual agent can determine or modify its behavior using the virtual material characteristic different than real-world material characteristic. For example, a virtual agent may perceive an object with a first real-world material characteristic as an object with a second, different material characteristic (e.g., a virtual material characteristic). As an example, a virtual agent may perceive a real-world wooden block or real-world wooden surface (e.g., a wood tabletop) as a block of ice or icy surface. In some such examples, the virtual agent may rely on some real-world geometric characteristics of the object/surface, but substitute the virtual material characteristic (ice) for the real-world material characteristic (wood).

In some embodiments, the electronic device can detect or estimate a temperature characteristic of the real world, and the estimate of the temperature characteristic of the real-world is used to influence behavior of the virtual agent. The estimate of the temperature characteristic can provide some understanding of temperature in the environment. For example, the estimate of the temperature characteristic may provide an indication of which regions of the real-world environment are at different temperatures. In some embodiments, the temperature characteristic is estimated on a per-pixel basis for visible surfaces in images of the environment (or alternatively on a per-voxel basis for the environment or per-vertex or per-face using a triangle mesh for the environment). For example, the temperature characteristic can be parameterized as an image-based temperature environment map. In some embodiments, sensors such as visible light sensors, near-infrared sensors, or long wave infrared sensors (e.g., image sensor(s) 206) capture images of the real-world environment. The images can be processed by processing circuitry (one or more of processor(s) 218) to classify each pixel (or voxel) in the images as a specific temperature. In some embodiments, deep learning (e.g., supervised) or other artificial intelligence or machine learning is used to estimate the temperature characteristic based on input image(s).

It should be understood that other parameterizations of the temperature characteristic are possible. Additionally, it should be understood that the estimate of the temperature characteristic is optionally derived from an intermediate representation (e.g., an environment map). In some embodiments, the temperature characteristic is derived at least in part from the lighting characteristic and the material characteristic (e.g., assigning temperature to the light sources and the impact on surfaces based on the incident light and the thermal conductivity characteristics of materials). In some embodiments, a semantic understanding of the real-world environment can be used to identify objects and the entire object can be classified with a specific temperature. For example, rather than estimating the temperature for each pixel of a wooden table, the estimation can estimate the temperature for a subset of the pixels and then apply this temperature to all the pixels of the wooden table. In some embodiments, the temperature characteristic may be a single temperature for the environment (e.g., using a temperature sensor of the device).

Figure 6A:
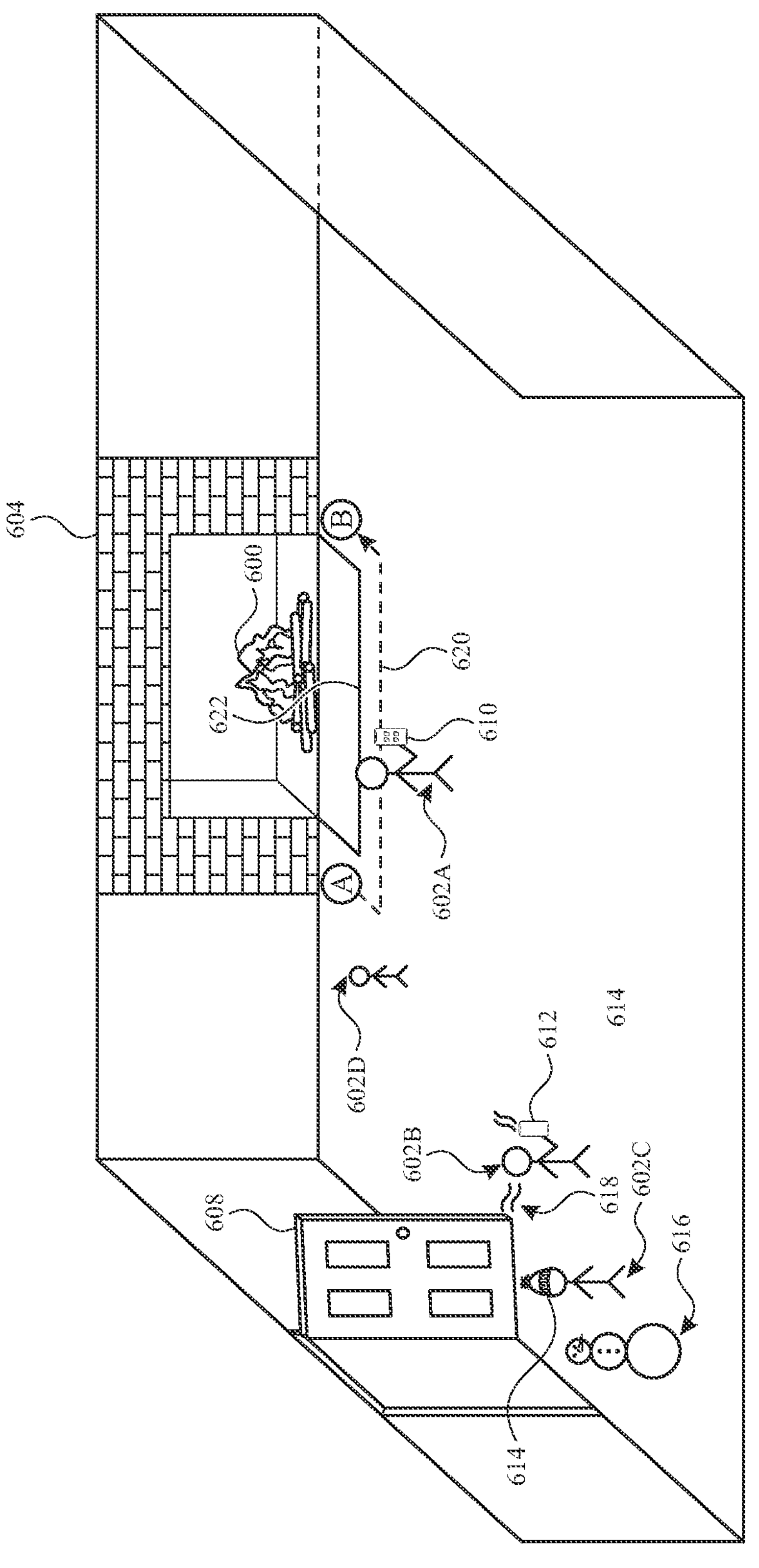
FIGS. 6A-6B illustrate examples of a virtual agent behaving in accordance with a temperature characteristic of a real-world environment according to some embodiments of the disclosure
Figure 6B:
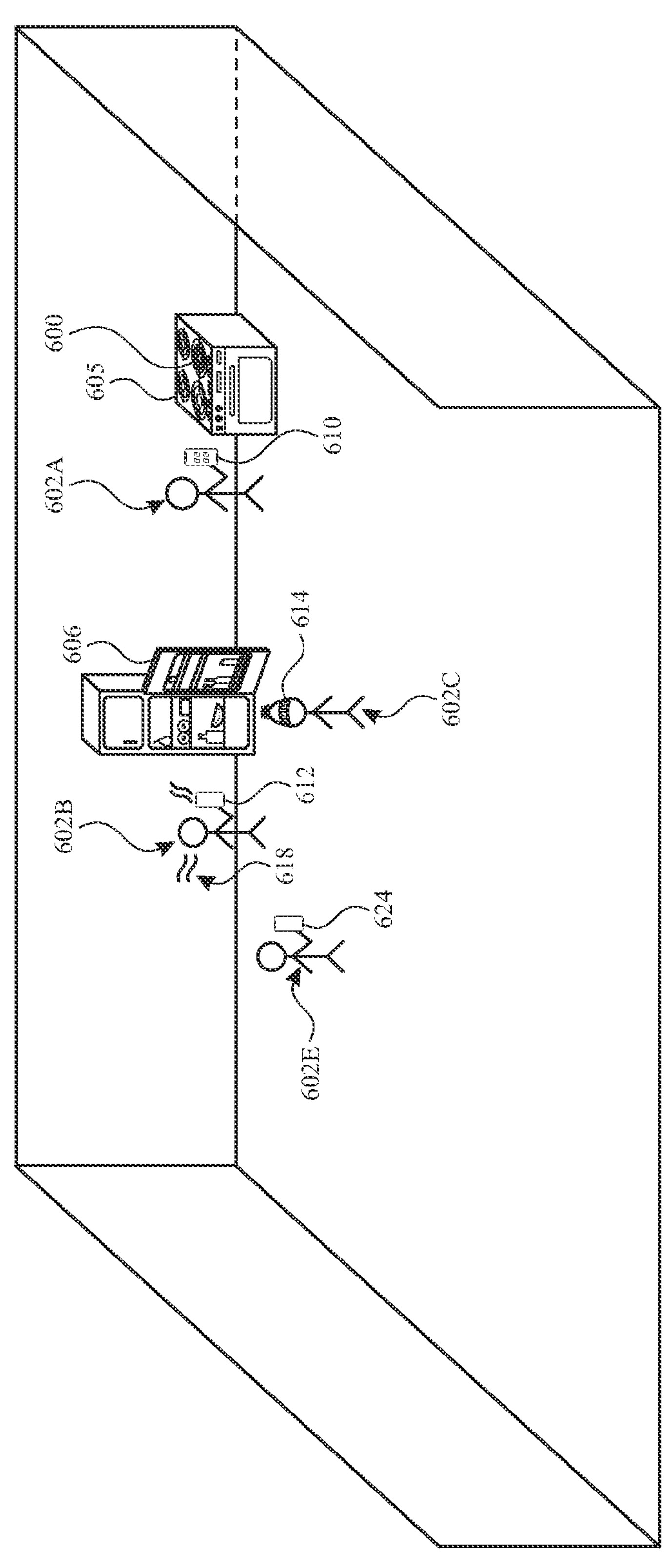

FIGS. 6A-6B illustrate examples of a virtual agent behaving in accordance with a temperature characteristic of a real-world environment according to some embodiments of the disclosure. FIGS. 6A-6B illustrate portions of computer-generated environment including various representations of real-world heat sources or cold sources. For example, the environment of FIG. 6A includes a real-world heat source, represented by a fire 600 in fireplace 604 (or a representation of a fire in a fireplace 604), and a real-world cold source, represented by open door 608 when external temperatures are cold. The environment of FIG. 6B includes a real-world heat source, represented by a fire 600 on stove 605, and a real-world cold source, represented by open refrigerator 606. As a result of the heat and cold sources in the environment, different regions of the environment may be warmer or colder.

In some embodiments, the behavior of the virtual agent is based on the estimated temperature characteristic of the real-world environment. In some embodiments, the virtual agent determines its behavior based on the temperature characteristic. For example, a virtual agent located in a hot region in the environment as defined by the temperature characteristic may perform a first action (e.g., putting on hot-temperature/weather appropriate clothing, drinking a cold beverage, etc.) and a virtual agent located in a cool region in the environment may perform a second, different action (e.g., putting on cold-weather/temperature appropriate clothing, drinking a warm beverage, etc.). For example, FIGS. 6A-6B illustrate virtual agent 602A drinking an iced beverage in proximity to fire 600, whereas virtual agent 602B is drinking a warm beverage 612 and virtual agent 602C is wearing a warm hat 614 in proximity to the door 608 open to the cold external environment or in proximity to open refrigerator 606. In some embodiments, the virtual agent determines where to perform an activity in the environment—in a region with suitable temperature-based on the temperature characteristic. For example, a virtual agent instructed to or independently deciding to build a snowman 616 may seek and navigate to a cooler region of the environment (e.g., near open door 608 or near open refrigerator 606), and a virtual agent instructed to or independently deciding to plant flowers may seek and navigate to a warmer region of the environment (e.g., near fire 600).

In some embodiments, the virtual agent determines movement based on the temperature characteristic. For example, a virtual agent may walk with a different style based on the temperature in the regions in which the virtual agent is walking. For example, a virtual agent may walk differently over a hot surface or a cold surface (e.g., hot sand, asphalt, stone or cold sand, asphalt, stone). For example, virtual agent 602D may walk over the hot stone floor 622 in front of fire 600 when traveling directly between point A and point B in a different manner than when walking around hot stone floor 622 along navigation path 620 (e.g., the virtual agent may move more quickly and on the balls of the feet to reduce contact time/area between the feet and the hot surface). In some embodiments, the virtual agent determines where to dwell or sit based on the temperature characteristic. For example, the virtual agent may prefer to dwell or sit in cooler regions (or on cooler surfaces) of a hot environment or a warmer region (or on warmer surfaces) of a cold environment (e.g., sitting in the shade in a sunny, hot environment, etc.). As another example, virtual agent 602A may stand or sit closer to fire 600 or further from fire 600 depending on the room temperature and the temperature gradient from the fire.

In some embodiments, the virtual agent determines where to place another virtual object in the environment based on the temperature characteristic. For example, a virtual agent 602E may seek to store food 624 in a cold region in the environment (e.g., a refrigerator 606) or place potted flowers in a warm region during times in which the environment is relatively cold (e.g., closer to fire 600, away from open door 608).

In some embodiments, the electronic device can cause display of a virtual representation of an interaction between the virtual agent and the environment. For example, the electronic device can cause display of a virtual agent's breathing as a virtual mist/steam 618 in cold regions of the environment (e.g., near open door 608 or refrigerator 606), whereas such a virtual mist/steam may not appear in hot regions of the environment (e.g., no virtual mist/steam is shown for virtual agent 602A near fire 600). The appearance of such an interaction may also depend on the temperature of the virtual agent. For example, the virtual mist/steam may appear when the body temperature of the virtual agent is hotter than the temperature of the environment around the virtual agent by a threshold amount, whereas the virtual mist/steam may not appear when the body temperature of the virtual agent not hotter than the temperature of the environment around the virtual agent by the threshold amount. In some examples, the interactions between a virtual object and the environment may vary in accordance with the temperature characteristic. For example, the electronic device can cause display of virtual steam from a hot drink in cold regions of the environment (steam rises from warm beverage 612 near open door 608), whereas such a virtual steam may not appear in hot regions of the environment (e.g., where the temperature differential is insufficient to display steam). As another example, virtual objects can be represented in different states or transition between states in accordance with the temperature. For example, ice cream or chocolate can melt slower in colder environments, faster in hotter environments, or not at all when the temperature of the environment allows for the ice cream or chocolate to remain solid. As another example, water can freeze or ice can melt based on the temperature in the environment.

In some embodiments, the behavior of the virtual agent in accordance with the temperature characteristic is further based on the personality of the virtual agent. For example, the virtual agent's personality may define an affinity for (or aversion to) specific temperatures using parameters and/or sliders (similar to those described in FIG. 4 and for the lighting characteristic).

As an example, the virtual agent with a strong affinity for a specified temperature may seek regions of the environment with the specified temperature (or temperature range). Likewise, a virtual agent with a strong aversion for a specified temperature may avoid regions of environment with the specified temperature (or temperature range). For example, if the virtual agent creates a navigation plan for movement in the environment, the virtual agent avoids or disfavors regions with temperatures to which the virtual agent has an aversion (e.g., too hot or too cold regions, etc.) and seeks or favors regions with temperatures to which the virtual agent has an affinity (regions with comfortable temperatures). For example, virtual agent 602D navigating from point A to point B in FIG. 6A may create a navigation plan represented by path 620 that avoids hot stone floor 622 in favor of a cooler path between point A and point B (e.g., and further from the fire). Additionally, when such a virtual agent is located in a region of the environment with a temperature to which the virtual agent has an aversion, the virtual agent may move to a different region of the environment (e.g., to a region with a temperature to which the virtual agent has an affinity or less aversion). For example, a virtual agent with a preference for a warmer environment may move away from open door 608 and/or closer to fire 600. In some embodiments, the behavior of the virtual agent can include an action to mitigate environmental conditions that are inconsistent with the affinity for a specific temperature. For example, a virtual agent with an aversion for cold temperatures can produce and drink a virtual warm beverage (e.g., warm beverage 612) or create a virtual fire, so that the virtual agent can comfortably dwell in the region of the environment (e.g., near the cooler region near open door 608). A virtual agent with a different personality may behave differently (e.g., favoring a cooler environment over a warmer environment, etc.). Additionally, a virtual agent neutral to a specific temperature may treat regions of the environment with different temperatures as equivalent and irrelevant when planning navigation, or may stay in its location without moving to a region with different temperature, or may take no action to mitigate the temperature characteristic.

The affinity (or aversion) to the temperature characteristics may also impact what activity to perform (or not perform), how to perform the activity (e.g., how to walk, where to dwell or sit), and/or where to place virtual objects, among other possibilities.

It is understood that the above description of representations of the temperature characteristic, personality and corresponding behaviors by the virtual agent in accordance with the personality and/or temperature characteristic are exemplary illustrations of improving the behavior/interactions between a virtual agent and the real world (optionally in accordance with the virtual agent's personality). Additionally, although the above description is primarily focused on estimating a temperature characteristic of a real-world environment, a virtual agent's behavior optionally also takes into account a virtual temperature characteristic for a computer-generated environment. For example, information about virtual heat sources and cold sources can be used (e.g., combined or superimposed) to determine a mixed-reality estimate of the temperature characteristic, which is used by the virtual agent to determine or modify behavior. In some embodiments, the virtual agent can determine or modify its behavior using the virtual temperature characteristic different than real-world temperature characteristic. For example, a virtual agent may perceive an object with a first real-world temperature characteristic as an object with a second, different temperature characteristic (e.g., a virtual temperature characteristic). As an example, a virtual agent may perceive a real-world hot object or surface (e.g., a hot mug or metal tabletop in the sun) as a cold or moderate temperature object (e.g., a room temperature mug or a cool tabletop). In some such examples, the virtual agent may rely on some real-world geometric characteristics of the object/surface, but substitute the virtual temperature characteristic (room temp or cool) for the real-world temperature characteristic (hot).

It is understood that although the above description separately describes the behavior of the virtual agent in accordance with the lighting characteristic, material characteristic or temperature characteristic independently, that the behavior of the virtual agent may be determined in accordance with a combination of the lighting characteristic, material characteristic and/or temperature characteristic. For example, the virtual agent may plant flowers in a region of the environment with soil, sufficient lighting and/or warm temperatures suitable for planting/growing flowers, whereas the virtual agent may sleep in a region of the environment with fabric surface, darkness and/or cooler temperatures suitable for sleeping comfortably, etc. Additionally or alternatively, in some examples, the behavior of the virtual agent may be determined in accordance with some real-world characteristics (the lighting characteristic, material characteristic and/or temperature characteristic) and with some virtual characteristics. For example, the real-world lighting characteristic and real-world geometric characteristic may be used, but the real-world material and/or temperature characteristics can be substituted for virtual material and/or temperature characteristics (e.g., a wooden block may be perceived as cold, icy block of the same dimensions and same lighting characteristic).

In some embodiments, the personality of a virtual agent includes a ranking of a multiple affinities to different characteristics. The ranking may be used to enable the virtual agent to balance various characteristics that may be in conflict. For example, a virtual agent may seek a bright, but cold region of the environment over a dark, but warm region of the environment—even though the virtual agent may have an affinity for both brightness and warmth—if the virtual agent prioritizes brightness over warmth (e.g., ranking the affinity for brightness higher than the affinity for warmth). In some embodiments, the ranking can be an ordered list of priorities of affinities for various characteristics. In some embodiments, the prioritization can be made by the virtual agent by weighting each affinity defined for the virtual agent's personality.

In some embodiments, as the lighting characteristic, material characteristic and/or temperature characteristic of the real-world environment change(s), the behavior of the virtual agent changes in accordance with the changing characteristic(s). For example, the lighting characteristic may change when a real-world object obstructs a light source (e.g., cloud blocking the sun, real-world object blocking a lamp) or from extinguishing a light source (e.g., sun setting, turning off light). In some such embodiments, the virtual agent changes its behavior in response to the change in lighting characteristic (e.g., the virtual agent moves to a brighter region of the environment, turns on a light, changes activity from one suitable to a bright environment to one suitable for a less bright or dark environment, etc.). It is understood that the virtual agent may update its behavior in accordance with changes in other characteristics of the real-world environment.

In some embodiments, virtual agent may infer or be informed regarding a temporal aspect of the change in a characteristic of the real-world environment, and the virtual agent may respond differently to a temporal change in a characteristic (e.g., one lasting less than a threshold duration) compared with a more permanent characteristic (e.g., one lasting more than a threshold duration). For example, the virtual agent may infer from movement properties (e.g., speed, trajectory, etc.) of an object that obstructs a light source that the light source may, within the threshold period of time, be unobstructed (e.g., a cloud passing in front of the sun or a person walking in front of a lamp). In some such examples, the virtual agent may not change or update its behavior in accordance with the temporary change of the lighting characteristic or the virtual agent may pause its behavior until the temporary change in the lighting characteristic concludes (e.g., pause reading until the environment brightens). In some such examples, the virtual agent may infer that the change in the lighting characteristic is not temporary (e.g., lasts longer than a threshold duration) or may not be able to infer whether or not the change is temporary. In some such examples, the virtual agent may immediately behave in accordance with the new lighting characteristic, or may wait some threshold period of time before behaving in accordance with the new lighting characteristic. It is understood that the virtual agent may/or may not update its behavior in accordance with temporary changes in other characteristics of the real-world environment (e.g., a temporary change in temperature when a heating/air conditioning system is activated).

Additionally, it is understood that the lighting characteristic, material characteristic, and temperature characteristic are example characteristics of the real-world environment that may influence the behavior of the virtual agent, but that other characteristics of the real-world environment (and optional of the virtual environment) may influence the behavior of the virtual agent (alone or in combination with one or more additional characteristics). For example, the shape and/or topology of the real-world environment (geometric characteristic) may influence a virtual agent's behavior. In some embodiments, sensors such as cameras (e.g., image sensor(s) 206) capture images of the real-world environment. The images can be processed by processing circuitry (one or more of processor(s) 218) to generate a geographic map of the environment (or otherwise provide some understanding of geometry/topology of the environment).

In some embodiments, the geometric characteristic is estimated on a per-pixel basis for visible surfaces in images of the environment (or alternatively on a per-voxel basis for the environment or per-vertex or per-face using a triangle mesh for the environment), optionally using deep learning (e.g., supervised) or other artificial intelligence or machine learning is used to estimate the geometric characteristic based on input image(s). It should be understood that other parameterizations of the geometric characteristic are possible.

Figure 7:
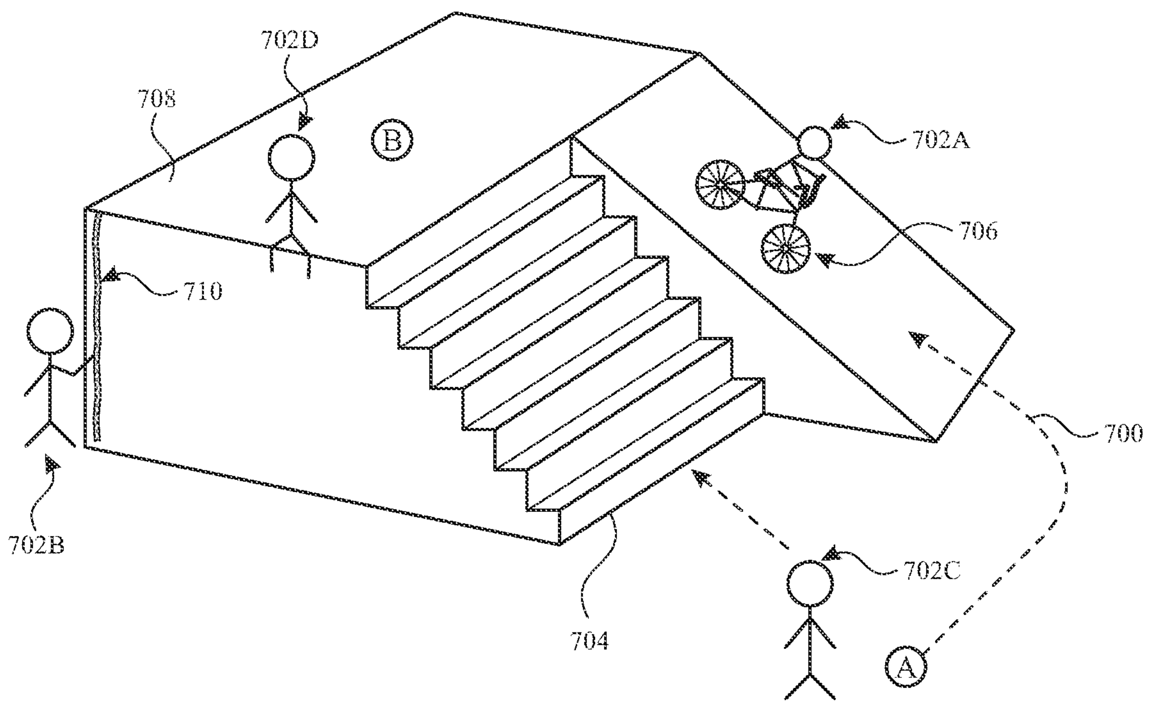
FIG. 7 illustrates an example of a virtual agent behaving in accordance with a geometric characteristic of a real-world environment according to some embodiments of the disclosure.

FIG. 7 illustrates an example of a virtual agent behaving in accordance with a geometric characteristic of a real-world environment according to some embodiments of the disclosure. In some embodiments, the virtual agent determines its behavior based on the geometric characteristic. For example, a virtual agent located in a planar surface region in the environment as defined by the geometric characteristic may perform a first action (e.g., riding a bicycle, etc.) and a virtual agent located in an uneven region in the environment may perform a second, different action (e.g., climbing, repelling, etc.). For example, virtual agent 702A is shown in FIG. 7 riding bicycle 706 down the planar ramp 700, whereas virtual agent 702B is shown climbing up or repelling the side of staircase 704 (e.g., using a virtual rope 710). In some embodiments, the virtual agent determines where to perform an activity in the environment—in a region with suitable shape/topology—based on the geometric characteristic. For example, a virtual agent instructed to or independently deciding to climb may seek and navigate to a region of the environment with objects to climb, and a virtual agent instructed to or independently deciding to ride a bicycle may seek and navigate to a region of the environment suitable for cycling, such as the aforementioned planar surfaces.

In some embodiments, the virtual agent determines movement based on the geometric characteristic. For example, a virtual agent may walk with a different style based on the slope of the terrain in the regions in which the virtual agent is walking. For example, a virtual agent may walk differently over a flat surface or an uneven or sloped surface. As another example, a virtual agent 702C may walk differently when ascending staircase 704 than when ascending ramp 700. In some embodiments, the virtual agent determines where to dwell or sit based on the geometric characteristic. For example, the virtual agent may prefer to dwell or sit in flat regions or sit with legs handing over an edge of a chair, table, etc. For example, virtual agent 702D may sit on surface 708 with its legs handing over the side of staircase 704 (over the edge of surface 708).

In some embodiments, the virtual agent determines where to place another virtual object in the environment based on the geometric characteristic. For example, a virtual agent may seek to place virtual objects with flat bottoms in a flat region and place rounded objects in region with a local minimum to avoid the virtual object rolling away.

In some embodiments, the behavior of the virtual agent in accordance with the geometric characteristic is further based on the personality of the virtual agent. For example, the virtual agent's personality may define an affinity for (or aversion to) specific geographic properties using parameters and/or sliders (similar to those described for FIG. 4 and the lighting characteristic).

As an example, the virtual agent with a strong affinity for achieving height may seek regions of the environment with increased height. Likewise, a virtual agent with a strong aversion to height may avoid regions of environment with height or seek regions of the environment with reduced height. For example, virtual agent 702C with an affinity for height may climb staircase 704 or ramp 700 to reach the height afforded by surface 708. In contrast, a virtual agent with an aversion to height may descend staircase 704 or ramp 700. Additionally, when such a virtual agent is located in a region of the environment without sufficient height (or where there are higher regions in the environment), the virtual agent may move to a different region of the environment (e.g., to a region with more height with which the virtual agent has an affinity or less aversion). The virtual agent may also have a personality defining a preference for how to achieve height. For example, if the virtual agent creates a navigation plan for movement in the environment (e.g., from point A to point B), the virtual agent with an affinity for stairs may seek to scale or climb objects in the environment resembling stairs (e.g., staircase 704) and may avoid or disfavors region without stairs (e.g., ramp 700). In some embodiments, the behavior of the virtual agent can include an action to mitigate environmental conditions that are inconsistent with the affinity for a height. For example, a virtual agent can produce and climb a virtual ladder so that the virtual agent can more comfortably dwell in a region of the environment without sufficient height (or alternatively the virtual agent can produce a shovel and dig virtual hole so that a virtual agent with an aversion to height can dwell comfortably in the region with less height). A virtual agent with a different personality may behave differently. Additionally, a virtual agent neutral to height may treat regions of the environment with different heights as equivalent and irrelevant when planning navigation, or may stay in its location without moving to a region with different height, or may take no action to mitigate the geometric characteristic.

The affinity (or aversion) to the geometric characteristics may also impact what activity to perform (or not perform), how to perform the activity (e.g., how to walk, where to dwell or sit), and/or where to place virtual objects, among other possibilities.

It is understood that the above description of representations of the geometric characteristic, personality and corresponding behaviors by the virtual agent in accordance with the personality and/or geometric characteristic are exemplary illustrations of improving the behavior/interactions between a virtual agent and the real world (optionally in accordance with the virtual agent's personality). Additionally, although the above description is primarily focused on estimating a geometric characteristic of a real-world environment, a virtual agent's behavior optionally also takes into account a virtual geometric characteristic for a computer-generated environment. For example, information about virtual objects can be used (e.g., combined or superimposed) to determine a mixed-reality estimate of the geometric characteristic, which is used by the virtual agent to determine or modify behavior. In some embodiments, the virtual agent can determine or modify its behavior using the virtual geometric characteristic different than real-world geometric characteristic. For example, a virtual agent may perceive an object with a first real-world geometric characteristic as an object with a second, different geometric characteristic (e.g., a virtual geometric characteristic). As an example, a virtual agent may perceive a real-world hexagonal block or real-world cobblestone surface as a rectangular block or a smooth/flat surface. In some such examples, the virtual agent may rely on some real-world characteristics of the object/surface (e.g. material characteristic), but substitute the virtual geometric characteristic for the real-world geometric characteristic.

In some embodiments, the virtual agent's personality can also define an affinity for objects in the real-world environment. In some embodiments, a virtual agent can have an affinity for categories of objects, optionally with category exceptions. For example, a virtual agent can have an affinity for beverages, and optionally exclude some type(s) of beverage (e.g., no dairy beverages, no hot beverages, etc.). As another example, a virtual agent can have an affinity for cylindrical-shaped objects, and optionally exclude some type of cylindrical objects (e.g., hollow cylinders, cylinders with a diameter larger than a threshold, etc.). In some embodiments, a virtual agent can have an affinity for specific object rather than affinity for an entire category of objects (e.g., an affinity for lattes or cylindrical drinking glasses). In some embodiments, a category for which the virtual agent has an affinity may be further defined based on an understanding of the type of virtual agent. For example, a virtual agent with an affinity for the category of food objects, may understand the scope of the category differently depending on whether the virtual agent is a humanoid or another creature (e.g., a dog) with different notions of what is edible.

In some embodiments, the personality of the virtual agent may be defined using abstract characteristics and the abstract characteristics can be mapped to characteristics of the real-world environment. In some examples, a virtual agent has a personality defined by an abstract characteristic of curiosity (e.g., using a slider or parameter). Curiosity may define a desire to visually explore areas of the environment that have not been seen by the virtual agent and/or that have not been recently seen by the virtual agent (e.g., within a threshold period of time). In some embodiments, a representation of the environment is loaded into memory for the virtual agent, such that the virtual agent has awareness of possible areas to explore. Additionally, the virtual agent may track (e.g., in memory of the virtual agent), which areas have been explored (optionally reclassifying areas that have not been explored within a threshold period of time as unexplored).

The virtual agent may use a characteristic of the real-world environment to efficiently meet this desire for visually exploring areas of the environment. For example, the virtual agent may seek height in the real-world environment (e.g., by navigating to surface 708 at height compared to its surroundings) because height often provides an increased field of view to allow the virtual agent to maximize exploration with minimal movement. Thus, the curiosity characteristic can make use of environmental information about height in a manner similar to having an affinity for height (e.g., in a manner similar to the above description for a geometric characteristic), optionally without requiring the user to separately define an affinity for height. For example, a virtual agent with more curiosity has a stronger desire to seek height and/or move to explore the environment, whereas a virtual agent with less curiosity has less desire to seek height and/or move to explore the environment.

In some embodiments, the virtual agent's personality defines emotional characteristics. For example, a virtual agent may express frustration or excitement with respect to certain characteristics of objects or of the real-world environment. For example, a virtual agent may be defined as having an affinity for another virtual agent, and as a result of encountering the virtual agent within the computer-generated environment, the virtual agent can express excitement (e.g., smile, dance, embrace, etc.). In a similar manner, the virtual agent may express excitement at encountering, seeing or acquiring virtual and/or real-world objects or environmental characteristics. For example, the virtual agent may express excitement for natural sunlight, snow, sand, heat, knobs, angled surfaces that can be used as slides, etc.). In some embodiments, a virtual agent may express frustration when a real-world obstacle is placed in its navigation path that requires the virtual agent to figure out a new navigation path. As with other features of personality, different virtual agents may act differently accordingly to different definitions of excitement or frustration in their respective personalities. For example, a first virtual agent may be frustrated by an obstacle in its navigation path (or become increasingly frustrated as more and more obstacles are placed into its navigation path) and eventually give up in frustration. In contrast, a second virtual agent may respond without frustration (or with mild frustration), updating its navigation path to avoid the obstacle and/or taking other action to overcome the obstacle (e.g., scaling the obstacle, destroying a virtual obstacle, etc.).

FIG. 8 illustrates an example process 800 for a virtual agent in a computer-generated environment in accordance with some embodiments of the disclosure. Process 800 is optionally performed at an electronic device such as device 100, device 200 or device 250. Some operations in process 800 are optionally combined and/or optionally omitted. The order of some operations in process 800 is optionally changed, in some embodiments.

In some embodiments, operations of process 800 are performed at an electronic device in communication with a display generation component and one or more input devices. A computer-generated environment is optionally displayed/presented via the display generation component (e.g., using display generation component(s) 214). The computer-generated environment includes, in some embodiments, a representation of the real-world environment (or at least a representation of one or more portions of a real-world environment) and a virtual agent with a personality defined by an affinity for one or more characteristics of the environment. In some embodiments, the representation of the real-world environment (or at least one or more portions of a real-world environment) is captured using one or more input devices (e.g., image sensor(s) 206). While presenting the computer-generated environment, a first characteristic of the one or more characteristics of the real-world environment is detected, at 802, via the one or more input devices. At 804, the electronic device causes, in some embodiments, the displayed virtual agent to perform a first action in accordance with the first characteristic of the real-world environment and in accordance with the affinity for the one or more characteristics including a first affinity for the first characteristic.

Additionally or alternatively to one or more of the embodiments disclosed above, in some embodiments, the virtual agent performs the first action in accordance with the first characteristic of the one or more characteristics of the real-world environment and in accordance with a characteristic of a virtual object of the computer-generated environment different from the virtual agent (e.g., in accordance with a real-world lighting characteristic and a virtual book, etc.).

Additionally or alternatively to one or more of the embodiments disclosed above, in some embodiments, while displaying the computer-generated environment, the electronic device further detects, at 806, via the one or more input devices, a second characteristic of the one or more characteristics of the real-world environment (e.g., different from the first characteristic). The virtual agent performs, at 808, the first action in accordance with the first characteristic of the one or more characteristics of the real-world environment and in accordance with the second characteristic of the one or more characteristics of the real-world environment (and in accordance with the first affinity for the first characteristics and/or a second affinity for the second characteristic). More generally, in some embodiments, the virtual agent performs the first action in accordance with multiple characteristics corresponding to the affinities defined in the virtual agent's personality.

Additionally or alternatively to one or more of the embodiments disclosed above, in some embodiments, the first characteristic includes a lighting characteristic of the real-world environment. Additionally or alternatively to one or more of the embodiments disclosed above, in some embodiments, the first characteristic includes a material characteristic of the real-world environment. Additionally or alternatively to one or more of the embodiments disclosed above, in some embodiments, the first characteristic includes a temperature characteristic of the real-world environment. Additionally or alternatively to one or more of the embodiments disclosed above, in some embodiments, the first characteristic includes a geometric characteristic of the real-world environment.

Additionally or alternatively to one or more of the embodiments disclosed above, in some embodiments, the first action includes one of performing an activity, orienting the virtual agent or a virtual object in the computer-generated environment, placing the virtual object in the computer-generated environment, movement of the virtual agent or modifying the movement of the virtual agent, and/or dwelling in the computer-generated environment.

Additionally or alternatively to one or more of the embodiments disclosed above, in some embodiments, the movement of the virtual agent in accordance with the first characteristic of the real-world environment and in accordance with the affinity for the one or more characteristics including the first affinity for the first characteristic includes moving toward or in one or more first regions of the computer-generated environment that the virtual agent favors and moving from or avoiding one or more second regions of the computer-generated environment that the virtual agent disfavors. Additionally or alternatively to one or more of the embodiments disclosed above, in some embodiments, modifying the movement of the virtual agent in accordance with the first characteristic of the real-world environment and in accordance with the affinity for the one or more characteristics including the first affinity for the first characteristic includes moving toward or in one or more first regions of the computer-generated environment that the virtual agent favors and moving from or avoiding one or more second regions of the computer-generated environment that the virtual agent disfavors.

Additionally or alternatively to one or more of the embodiments disclosed above, in some embodiments, the movement of the virtual agent in accordance with the first characteristic of the real-world environment and in accordance with the affinity for the one or more characteristics including the first affinity for the first characteristic includes creating a navigation plan for the virtual agent to increase time or distance of the navigation plan within one or more first regions of the computer-generated environment that the virtual agent favors and to decrease time or distance of the navigation plan within one or more second regions of the computer-generated environment that the virtual agent disfavors. Additionally or alternatively to one or more of the embodiments disclosed above, in some embodiments, modifying the movement of the virtual agent in accordance with the first characteristic of the real-world environment and in accordance with the affinity for the one or more characteristics including the first affinity for the first characteristic includes modifying a navigation plan for the virtual agent to increase time or distance of the navigation plan within one or more first regions of the computer-generated environment that the virtual agent favors and to decrease time or distance of the navigation plan within one or more second regions of the computer-generated environment that the virtual agent disfavors.

Additionally or alternatively to one or more of the embodiments disclosed above, in some embodiments, the electronic device modifies the appearance of the representation of the real-world environment in response to the first action in accordance with the first characteristic (e.g., adding virtual footprints, adding virtual steam, etc.).

Additionally or alternatively to one or more of the embodiments disclosed above, in some embodiments, the electronic device further detects, at 810, a change in the first characteristic of the one or more characteristics of the real-world environment (e.g., via the one or more input devices). In response to detecting the change in the first characteristic of the one or more characteristics of the real-world environment, the electronic device causes, at 812, the virtual agent to perform a second action, different from the first action, in accordance with the first characteristic of the one or more characteristics of the real-world environment (e.g., after the change) and/or in accordance with the affinity for the first characteristic. Additionally or alternatively to one or more of the embodiments disclosed above, in some embodiments, in response to detecting the change in the first characteristic of the real-world environment: in accordance with a determination that the change in the first characteristic is temporary, the electronic device continues performing the first action in accordance with the first characteristic of the real-world environment without performing the second action.

Additionally or alternatively to one or more of the embodiments disclosed above, in some embodiments, the action includes using a virtual object or taking a virtual action in accordance with the affinity for the first characteristic to remedy an aversion to the first characteristic.

Additionally or alternatively to one or more of the embodiments disclosed above, in some embodiments, the electronic device further displays, via the display generation component, the computer-generated environment including a second virtual agent. The electronic device causes the second virtual agent to perform a second action in accordance with the first characteristic of the real-world environment, different from the first action (e.g., performed by the first virtual agent).

Additionally or alternatively to one or more of the embodiments disclosed above, in some embodiments, the first action comprises movement in computer-generated environment, and the amount of the movement, speed of the movement, or trajectory of the movement is in accordance with the first characteristic of the real-world environment and of the affinity for the first characteristic (e.g., the virtual agent may walk differently depending on the lighting, material, temperature, shape/topography, etc.).

Additionally or alternatively to one or more of the embodiments disclosed above, in some embodiments, the one or more input devices include a camera. Additionally or alternatively to one or more of the embodiments disclosed above, in some embodiments, the one or more input devices include a depth sensor.

It should be understood that the particular order of the description of the operations in FIG. 8 is merely exemplary and is not intended to indicate that the described order is the only order in which the operations could be performed. One of ordinary skill in the art would recognize various ways to reorder the operations described herein.

The operations of process described above are, optionally, implemented by an electronic device comprising: one or more processors; memory; and one or more programs stored in the memory. The one or more programs stored in the memory and configured to be executed by the one or more processors, cause the processor to perform any of the above operations. The operations of process described above are, optionally, implemented by a storing one or more programs. The one or more programs stored in the non-transitory computer readable storage medium and configured to be executed by the one or more processors of an electronic device, cause the processor to perform any of the above operations.

The operations of process described above are, optionally, implemented by running one or more functional modules in an information processing apparatus such as general-purpose processors (e.g., as described with respect to FIGS. 2A-2B) or application specific chips. Further, the operations described above with reference to FIG. 8 are, optionally, implemented by components depicted in FIGS. 2A-2B.

It should be understood that, in some embodiments, all the content displayed in an XR environment is virtual content. In some embodiments, the XR environment includes representations of a real-world environment (e.g., provided by image sensors and passed through to the display) and/or virtual content. In some embodiments, the XR environment may be presented to the user via an at least partially transparent display in which a real-world environment is visible (e.g., an optical pass-through without computer-generation of the real-world environment) and in which virtual content is displayed via the display-generation component. As used herein, presenting an environment includes presenting a real-world environment (e.g., optical pass-though), presenting a representation of a real-world environment (e.g., displaying video-pass though via a display generation component), and/or presenting a virtual environment (e.g., displaying via a display generation component). Virtual content (e.g., user interfaces, virtual agents, etc.) can also be presented with these environments (e.g., displayed via a display generation component). It is understood that as used herein the terms "presenting"/"presented" and "displaying"/"displayed" are often used interchangeably, but depending on the context it is understood that when a real-world environment is visible to a user without being generated by the display generation component, such a real-world environment is presented to the user and not technically displayed to the user.

Additionally or alternatively, as used herein, the singular forms "a," "an," and "the" are intended to include the plural forms, unless the context clearly indicates otherwise. The term "and/or" as used herein refers to and encompasses any and all possible combinations of one or more of the associated listed items. The terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Further, although the following description uses terms "first," "second," etc. to describe various elements, these elements should not be limited by the terms. These terms are only used to distinguish one element from another. For example, a first characteristic (or first virtual agent) could be termed a second characteristic (or second virtual agent), and, similarly, a second characteristic (or second virtual agent) could be termed a first characteristic (or first virtual agent), without departing from the scope of the various described embodiments. The first characteristic (or virtual agent) and the second characteristic (or virtual agent) are both characteristics (or virtual agents), but they are not the same characteristics (or virtual agents).

Additionally or alternatively, as described herein, the term "if," optionally, means "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. The terminology used in the description of the various described embodiments herein is for the purpose of describing particular embodiments only and is not intended to be limiting.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a display and one or more input devices:

presenting, using the display, a computer-generated environment including a real-world environment and a virtual agent with an affinity for one or more characteristics of the real-world environment, wherein the one or more characteristics include at least one of lighting, materials, temperature, or geographic properties;

while presenting the computer-generated environment, detecting, using the one or more input devices, a first characteristic of the one or more characteristics of the real-world environment; and causing the virtual agent to perform a first action in accordance with the first characteristic of the real-world environment and in accordance with the affinity for the one or more characteristics including a first affinity for the first characteristic, wherein:

the first action includes one of performing an activity, orienting the virtual agent or a virtual object in the computer-generated environment, placing the virtual object in the computer-generated environment, movement of the virtual agent or modifying the movement of the virtual agent, or dwelling in the computer-generated environment; and the movement of the virtual agent in accordance with the first characteristic of the real-world environment and in accordance with the affinity for the one or more characteristics including the first affinity for the first characteristic comprises moving toward or in one or more first regions of the computer-generated environment that the virtual agent favors and moving from or avoiding one or more second regions of the computer-generated environment that the virtual agent disfavors.

2. A method comprising:

at an electronic device in communication with a display and one or more input devices:

presenting, using the display, a computer-generated environment including a real-world environment and a virtual agent with an affinity for one or more characteristics of the real-world environment, wherein the one or more characteristics include at least one of lighting, materials, temperature, or geographic properties;

while presenting the computer-generated environment, detecting, using the one or more input devices, a first characteristic of the one or more characteristics of the real-world environment; and causing the virtual agent to perform a first action in accordance with the first characteristic of the real-world environment and in accordance with the affinity for the one or more characteristics including a first affinity for the first characteristic, wherein:

the first action includes one of performing an activity, orienting the virtual agent or a virtual object in the computer-generated environment, placing the virtual object in the computer-generated environment, movement of the virtual agent or modifying the movement of the virtual agent, or dwelling in the computer-generated environment; and modifying the movement of the virtual agent in accordance with the first characteristic of the real-world environment and in accordance with the affinity for the one or more characteristics including the first affinity for the first characteristic comprises moving toward or in one or more first regions of the computer-generated environment that the virtual agent favors and moving from or avoiding one or more second regions of the computer-generated environment that the virtual agent disfavors.

3. A method comprising:

at an electronic device in communication with a display and one or more input devices:

presenting, using the display, a computer-generated environment including a real-world environment and a virtual agent with an affinity for one or more characteristics of the real-world environment, wherein the one or more characteristics include at least one of lighting, materials, temperature, or geographic properties;

while presenting the computer-generated environment, detecting, using the one or more input devices, a first characteristic of the one or more characteristics of the real-world environment; and causing the virtual agent to perform a first action in accordance with the first characteristic of the real-world environment and in accordance with the affinity for the one or more characteristics including a first affinity for the first characteristic, wherein:

the first action includes one of performing an activity, orienting the virtual agent or a virtual object in the computer-generated environment, placing the virtual object in the computer-generated environment, movement of the virtual agent or modifying the movement of the virtual agent, or dwelling in the computer-generated environment; and the movement of the virtual agent in accordance with the first characteristic of the real-world environment and in accordance with the affinity for the one or more characteristics including the first affinity for the first characteristic comprises creating a navigation plan for the virtual agent to increase time or distance of the navigation plan within one or more first regions of the computer-generated environment that the virtual agent favors and to decrease time or distance of the navigation plan within one or more second regions of the computer-generated environment that the virtual agent disfavors.

4. A method comprising:

at an electronic device in communication with a display and one or more input devices:

presenting, using the display, a computer-generated environment including a real-world environment and a virtual agent with an affinity for one or more characteristics of the real-world environment, wherein the one or more characteristics include at least one of lighting, materials, temperature, or geographic properties;

while presenting the computer-generated environment, detecting, using the one or more input devices, a first characteristic of the one or more characteristics of the real-world environment; and causing the virtual agent to perform a first action in accordance with the first characteristic of the real-world environment and in accordance with the affinity for the one or more characteristics including a first affinity for the first characteristic, wherein:

the first action includes one of performing an activity, orienting the virtual agent or a virtual object in the computer-generated environment, placing the virtual object in the computer-generated environment, movement of the virtual agent or modifying the movement of the virtual agent, or dwelling in the computer-generated environment; and modifying the movement of the virtual agent in accordance with the first characteristic of the real-world environment and in accordance with the affinity for the one or more characteristics including the first affinity for the first characteristic comprises modifying a navigation plan for the virtual agent to increase time or distance of the navigation plan within one or more first regions of the computer-generated environment that the virtual agent favors and to decrease time or distance of the navigation plan within one or more second regions of the computer-generated environment that the virtual agent disfavors.

* * * * *